(12) United States Patent
Duncan et al.

(10) Patent No.: US 11,421,804 B2
(45) Date of Patent: Aug. 23, 2022

(54) QUICK INSTALLATION COUPLING

(71) Applicant: Aalberts integrated piping systems Americas, Inc., Matthews, NC (US)

(72) Inventors: Patrick W. Duncan, Marshville, NC (US); Daniel Foster, Troutman, NC (US); Jorden Hardzinski, Peachland, NC (US); Julie Howell, Indian Trail, NC (US); Matthew Williams, Charlotte, NC (US); Phillip Yontz, Rock Hill, SC (US)

(73) Assignee: Aalberts integrated piping systems APAC, Inc., Pintung (TW)

( * ) Notice: Subject to any disclaimer, the term of this patent is extended or adjusted under 35 U.S.C. 154(b) by 206 days.

(21) Appl. No.: 16/852,989

(22) Filed: Apr. 20, 2020

(65) Prior Publication Data

US 2020/0332934 A1   Oct. 22, 2020

Related U.S. Application Data

(60) Provisional application No. 62/864,767, filed on Jun. 21, 2019, provisional application No. 62/862,241, filed on Jun. 17, 2019, provisional application No. 62/836,166, filed on Apr. 19, 2019.

(51) Int. Cl.
*F16L 23/08* (2006.01)
*F16L 23/00* (2006.01)

(52) U.S. Cl.
CPC ............ *F16L 23/08* (2013.01); *F16L 23/003* (2013.01)

(58) Field of Classification Search
CPC ....... F16L 23/003; F16L 23/006; F16L 23/08; F16L 23/24; F16L 21/06; F16L 2201/10

USPC .......... 285/411, 93, 337, 367, 373, 420, 419
See application file for complete search history.

(56) References Cited

U.S. PATENT DOCUMENTS

| | | | |
|---|---|---|---|
| 29,731 | A | 8/1860 | Truss |
| D142,057 | S | 8/1945 | Baxter |
| 3,251,615 | A | 5/1966 | Short, III |
| 3,362,730 | A | 1/1968 | Clair et al. |

(Continued)

FOREIGN PATENT DOCUMENTS

| | | |
|---|---|---|
| CN | 2352801 | 12/1999 |
| CN | 2374723 | 4/2000 |

(Continued)

OTHER PUBLICATIONS

Victaulic 26.08-TCH_1 (2009), 4 pages.
(Continued)

*Primary Examiner* — Aaron M Dunwoody

(57) ABSTRACT

The present disclosure relates to an installation ready housing type pipe coupling for creating a sealed connection between coaxial groove ended pipes, a hold open clip for the coupling, and other modifications and improvements thereof. The coupling comprises a first and second housing segments creating a cavity, a gasket provided within the cavity, a first and second bolts and nuts connecting the hosing segments at opposite ends, and a hold open clip. The first nut is affixed to the first bolt. The second nut can be adjusted along the second bolt. The hold open clip helps to attach the two housing segments in the preassembled state while keeping the coupling open. The hold open clip may also indicate a proper installation of the coupling.

10 Claims, 23 Drawing Sheets

(56) References Cited

U.S. PATENT DOCUMENTS

| | | |
|---|---|---|
| 3,423,111 A | 1/1969 | Elsner |
| 4,311,248 A | 1/1982 | Westerlund et al. |
| 4,471,979 A | 9/1984 | Gibb et al. |
| 4,702,499 A | 10/1987 | deRaymond et al. |
| 5,207,459 A | 5/1993 | Glover |
| 5,375,888 A | 12/1994 | Ikeda |
| 5,904,325 A | 5/1999 | Hung |
| 6,095,197 A | 8/2000 | Kane |
| 6,170,884 B1 | 1/2001 | McLennan et al. |
| 6,227,577 B1 | 5/2001 | Ikeda et al. |
| 6,626,466 B1 | 9/2003 | Dole |
| 6,945,569 B1 | 9/2005 | Diaz et al. |
| 7,086,131 B2 | 8/2006 | Gibb et al. |
| 7,207,606 B2 | 4/2007 | Owen et al. |
| 7,296,451 B2 | 11/2007 | Dole |
| D583,914 S | 12/2008 | Pierce et al. |
| 7,510,033 B2 | 3/2009 | Lutzhoft et al. |
| 7,516,636 B2 | 4/2009 | Dole |
| D605,736 S | 12/2009 | Porter et al. |
| 7,665,773 B2 | 2/2010 | Jones et al. |
| 7,712,796 B2 | 5/2010 | Gibb et al. |
| D629,072 S | 12/2010 | Madara et al. |
| D629,074 S | 12/2010 | Shah et al. |
| D629,078 S | 12/2010 | Dole et al. |
| 7,921,536 B2 | 4/2011 | Dole |
| 7,950,701 B2 | 5/2011 | Dole et al. |
| 8,177,263 B2 | 5/2012 | Dole et al. |
| 8,282,136 B2 | 10/2012 | Vandal et al. |
| 8,312,616 B2 | 11/2012 | Dole et al. |
| 8,424,918 B2 | 4/2013 | Gibb et al. |
| 8,517,430 B2 | 8/2013 | Dole et al. |
| 8,550,502 B2 | 10/2013 | Vandal et al. |
| 8,615,865 B2 | 12/2013 | Vandal et al. |
| 8,621,741 B2 | 1/2014 | Hagiya |
| 8,646,165 B2 | 2/2014 | Gibb et al. |
| 8,646,814 B2 | 2/2014 | Lippka et al. |
| 8,733,799 B2 | 5/2014 | Gibb et al. |
| RE45,304 E | 12/2014 | Dole et al. |
| 8,905,440 B2 | 12/2014 | Hagiya |
| 8,979,138 B2 | 3/2015 | Dole et al. |
| 9,239,123 B2 | 1/2016 | Vandal et al. |
| 9,297,482 B2 | 3/2016 | Vandal et al. |
| 9,500,307 B2 | 11/2016 | Beagen, Jr. |
| 9,534,715 B2 | 1/2017 | Beagen, Jr. |
| 9,726,310 B2 | 8/2017 | Gibb et al. |
| 9,746,119 B2 | 8/2017 | Hagiya |
| 9,770,796 B2 | 9/2017 | Hagiya |
| D819,435 S | 6/2018 | Bancroft et al. |
| D820,074 S | 6/2018 | Huettemann et al. |
| 10,036,493 B2 | 7/2018 | Vandal et al. |
| 10,047,885 B2 | 8/2018 | Vandal et al. |
| 10,458,579 B2 | 10/2019 | Bowman et al. |
| 10,627,025 B2 | 4/2020 | Bowman et al. |
| 11,060,639 B2 | 7/2021 | Cuvo et al. |
| 2002/0014772 A1 | 2/2002 | Amedure et al. |
| 2002/0050363 A1 | 5/2002 | Hagiya |
| 2005/0242585 A1 | 11/2005 | Dole et al. |
| 2007/0040336 A1 | 2/2007 | Sun et al. |
| 2008/0246279 A1* | 10/2008 | van Walraven ....... F16L 3/1016 285/420 |
| 2011/0146049 A1 | 6/2011 | Hagiya |
| 2011/0154646 A1 | 6/2011 | Hagiyn |
| 2014/0096361 A1 | 4/2014 | Hagiya |
| 2015/0300549 A1 | 10/2015 | Cheng-Sheng et al. |
| 2015/0345679 A1 | 12/2015 | Hagiya |
| 2016/0040816 A1 | 2/2016 | Cheng-Sheng et al. |
| 2017/0328500 A1 | 11/2017 | Bowman et al. |

FOREIGN PATENT DOCUMENTS

| | | |
|---|---|---|
| CN | 2556454 | 6/2003 |
| CN | 2597805 | 1/2004 |
| CN | 1701196 | 11/2005 |
| CN | 1813150 | 8/2006 |
| CN | 1860323 | 11/2006 |
| CN | 1932363 | 3/2007 |
| CN | 201521732 U | 7/2010 |
| EP | 0352018 | 1/1990 |
| EP | 0398471 | 11/1990 |
| EP | 0794379 | 9/1997 |
| EP | 0926414 | 6/1999 |
| EP | 2971924 | 9/2014 |
| GB | 2189000 | 10/1987 |
| GB | 2229245 | 9/1990 |
| GB | 2355293 | 4/2001 |
| JP | 2003042360 | 2/2003 |
| TW | 013650 | 9/1973 |
| TW | 069339 | 8/1985 |
| TW | 075044 | 2/1986 |
| TW | 093483 | 11/1987 |
| TW | 177610 | 1/1992 |
| TW | I227310 | 1/1992 |
| TW | 233749 | 11/1994 |
| TW | 263044 | 11/1995 |
| TW | 302063 | 4/1997 |
| TW | 359735 | 6/1999 |
| TW | 360356 | 6/1999 |
| TW | 375232 | 11/1999 |
| TW | 383828 | 3/2000 |
| TW | 420269 | 1/2001 |
| TW | 453414 | 9/2001 |
| TW | 461945 | 11/2001 |
| TW | 463021 | 11/2001 |
| TW | 509302 | 11/2002 |
| TW | 521136 | 2/2003 |
| TW | 576136 | 2/2004 |
| TW | M245346 | 10/2004 |
| TW | 200600711 | 1/2006 |
| TW | 200606365 | 2/2006 |
| TW | 200606366 | 2/2006 |
| TW | 200607947 | 3/2006 |
| TW | 200607948 | 3/2006 |
| TW | 200712366 | 4/2007 |
| TW | M376675 U | 3/2010 |
| TW | 201111671 | 4/2011 |
| WO | 2014151076 | 9/2014 |

OTHER PUBLICATIONS

Shurjoint product catalog (2018), 5 pages.
Victaulic, Anatomy of a Grooved Pipe Joint, 04.01 (2005), 4 pages.
Victaulic, Coupling for Copper Tubing Style 606, 22.02 (2006), 4 pages.
Victaulic, Plain End Piping System for High Density Polyethylene Pipe, 19.01 (1997), 1 page.
Victaulic, Style 22 Vic-Ring Coupling, 16.02 (2005), 2 pages.
Victaulic, Style 995 Coupling for HOPE Pipe, 19.02 (2001), 2 pages.
Victaulic, Gasket Selection Guide, Revised 6/01, 3 pages.
Victaulic, Style 005 Firelock Rigid Coupling, (1999), 2 pages.
Victaulic, Couplings and Fittings for JIS Pipe, 06.17 (2002), 4 pages.
Tyco Fire Building Products, Grinnell 2007—Grooved Fire Protection Installation Manual, IH-1000FP (Aug. 2007), 11 pages.
Tyco Fire Building Products, Grinnell Mechanical Products, (2008), 11 pages.
Shurjoint Piping Products, 2006 General Catalog, 9 pages.
Victaulic, IPS Carbon Steel Pipe Grooved Couplings, 06.04 (1999), 2 pages.
Victaulic, Style 44 Vic-Ring Coupling, 16.05 (2005), 3 pages.
A New Pipeline Connection Technology—A Hoop Connection; Chinese Academic Journal Electronic, vol. 164, Jun. 2000); 5 pages (English translation provided).
Pipeline Connection Sealing Device; Chinese Academic Journal Electronic, (Sep. 2000), 2 pages (English translation provided).
Shurjoint Piping Products General Catalog (2005), 3 pages.
IPR2016-00276 (U.S. Pat. No. 8,733,799), *Tyco Fire Products LP v. Victaulic Co.*, 268 pages.
IPR2016-00278 (U.S. Pat. No. 8,646,165), *Tyco Fire Products LP v. Victaulic Co.*, 368 pages.

(56) References Cited

OTHER PUBLICATIONS

IPR2016-00279 (U.S. Pat. No. 8,646,165), *Tyco Fire Products LP v. Victaulic Co.*, 360 pages.
*Victaulic Co. v. Andrei Iancu* 2017-2424, 2017-2426, Decision dated Nov. 29, 2018, 11 pages.
File History of Reexam U.S. Appl. No. 90/012,060, filed Dec. 16, 2011 (U.S. Pat. No. 7,950,701 C1, granted dated Sep. 4, 2012); 274 pages.
File History of U.S. Appl. No. 13/415,086, filed Dec. 30, 2014, 406 page.

* cited by examiner

FIG. 18A
FIG. 18B
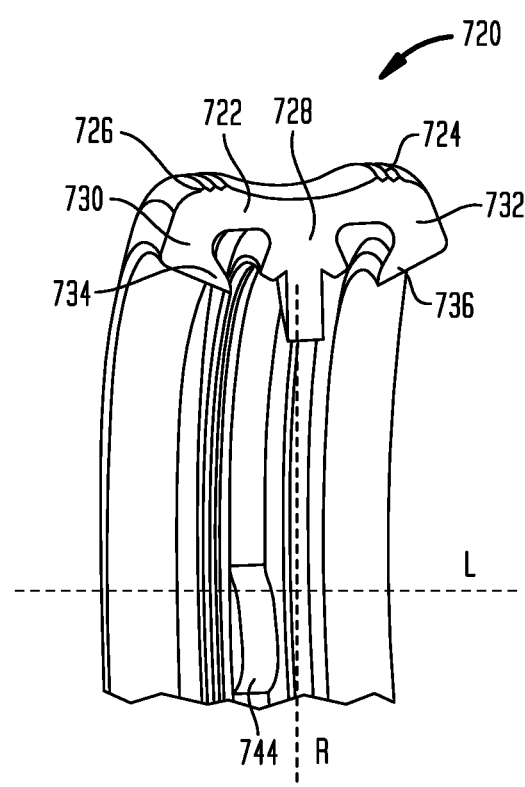
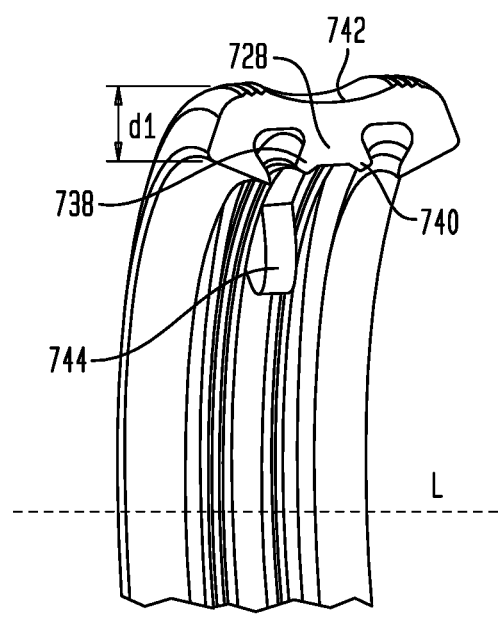

QUICK INSTALLATION COUPLING

CROSS REFERENCE TO RELATED APPLICATIONS

This application claims the benefit of priority to U.S. provisional application No. 62/836,166, filed Apr. 19, 2019; U.S. provisional application No. 62/862,241, filed Jun. 17, 2019; and U.S. provisional application No. 62/864,767, filed Jun. 21, 2019, the entire contents of which are incorporated herein by reference.

TECHNICAL FIELD

The invention relates to an installation ready housing type pipe coupling for creating a sealed connection between coaxial groove ended pipes, a hold open clip for the coupling, and other modifications and improvements thereof

BACKGROUND

Several methods are commonly used to join pipes or fittings: welding, gluing, threading, flanging, or grooving. Grooved couplings are commonly used in industry due to their low labor requirements, speed of installation, reliability, and their ability to be removed.

Grooved pipe couplings are widely used for axially joining two pipes together in such a way as to create a liquid tight union between the pipe ends. Common practice in the grooved coupling or fitting industry is to join pipes or fittings using a "grooved" coupling that has one or more bolts or levers that are tightened around the circumference of the pipe bringing two or more housing pieces together to engage a key (located on the inner diameter of the coupling housing) and groove (located on the outer diameter of the pipe).

Generally, the coupling is formed of arcuate housing segments which are fastened around the pipe ends to form a generally ring-like coupling housing. Typically, two segments are used, a pair of arcuate or generally semicircular housing halves, which are fastened together, often bolted together. Housing halves are substantially U- or C-shaped in longitudinal (axial) cross-section to provide room for gasket pieces. In some models, the inwardly projecting peripheral edges of the housing halves, also referred to as shoulders, are shaped with keys or lands for interlocking within circumferential grooves now commonly provided in the pipe ends. The engagement of the key and groove limit axial movement of the pipe segments prevent them from separating. The coupling housing also limits the angular deflection allowed between the two opposing pipe sections.

The coupling is typically secured as bolts are tightened through bolt holes until the key segments engage the circumferential grooves on the pipe ends, thus fastening the pipes together. Where the two housing halves meet around the circumference of the pipes, a mating structure is often used to lock one housing half to the other end to add stability. A rubber gasket, also frequently U-shaped or C-shaped in longitudinal (axial) cross-section, is typically arranged within the coupling in a gasket pocket formed by the U-shaped longitudinal cross-section of the coupling housing, such that when the housing halves are tightened against the pipe ends the inner peripheral edges of the gasket are sealed against the pipe end portions.

Traditional couplings are typically shipped as multi-part disassembled pipe coupling components that must be assembled on site, and in situ, typically overhead and in hard to reach places. Preassembled coupling designs were available, however, installation still requires significant efforts, and may require complex in situ assembly. For many years, in situ assembly and installation of such couplings has been the rule because no better alternative appeared to be practical.

Quick install couplings are replacing traditional grooved couplings because of their increased installation speed and ease of handling during the installation process. This creates a time and money saving benefit to users.

In order to reduce installation time and labor cost, modern couplings are designed as "installation ready" or "stab" couplings. Stab style grooved couplings are preassembled and do not have to be disassembled for installation on the pipe. In the preassembled state, the housing segments are held together. A sealing element or gasket typically resides between the coupling housing and the pipe to prevent liquid from escaping the piping system. The coupling housing and gasket are designed to allow the insertion of the pipe and then tightened onto the OD (outer diameter) of the pipe groove to provide the desired constraint. However, there are somewhat contradicted needs to keep the housing segments open up in the preassembled state to make the insertion of pipe ends easier, while keeping the components in appropriate positions to facilitate appropriate installation and avoid misalignment.

In addition, as the housing segments are not constrained in relative position to each other, the housing segments may move relative to each other and deform the gasket, thus interfering with the installation of the coupling over the grooved pipe end. There thus exists a need to hold open the housing segments prior to the installation of the pre-assembled coupling.

There still exist needs for better designed installation ready, i.e., stab style couplings that are easy to install, secure, and cost effective.

SUMMARY

In some aspects, a coupling configured for connecting two grooved pipe ends comprises a first and second housing segments, a gasket, a first bolt, a first nut, a second bolt, a second nut, and a hold open clip. Each of the first and second housing segments comprises: an arcuate center portion, wherein an interior surface of the center portion comprising two arcuate keys for engaging the grooves of the two pipe ends; a first bolting portion, comprising a first bolt hole and a first coupling bolt pad; and a second bolting portion, comprising a second bolt hole and a second coupling bolting pad, wherein the interior surfaces of the first and second housing segments are facing each other, creating a center cavity. The gasket is located within the center cavity. The first bolt connects the first and second housing segments through the first bolt holes of the first bolting portions of each of the first and second housing segments. The first nut is affixed to the first bolt. The second bolt connects the first and second housing segments through the second bolt holes of the second bolting portions of each of the first and second housing segments. The second nut can be adjusted along the second bolt. The hold open clip comprises: a mounting portion comprising an opening that accommodates the first bolt and extending in a longitudinal direction and a width direction, wherein the opening does not allow passage of the first nut or a bolt head of the first bolt; and a tab connected to a side of the mounting portion and having an outer edge; and wherein the tab is bent relative to the mounting portion while the tab extends away from the mounting portion, whereby the outer edge is located outside of the mounting portion.

According to some aspects, the mounting portion may be flat or bent. The tab may extend over a part of the side of the mounting portion. The tab may comprise a first tab and a second tab that are connected to opposite sides of the mounting portion. Each of the outer edges may be slopped, and the hold open clip may be mounted to the first bolt in an orientation that a thicker side of the hold open clip is located away from a center of the coupling. The hold open clip may maintain the coupling in a spaced apart configuration when the coupling is not tightened. The tab may pivot away from the mounting portion so that the hold open clip is flattened when the coupling is tightened. When the mounting portion is ben, the mounting portion may be flattened when the coupling is tightened. The hold open clip may be formed from at least one selected from a group comprising sheet metal, stamped metal, cast metal, machined plastic, and molded plastic.

In some aspects, a coupling configured for connecting two grooved pipe ends comprises a first and second housing segments, a gasket, a first bolt, a first nut, a second bolt, a second nut, and a hold open clip. The first and second housing segments comprises an arcuate center portion, wherein an interior surface of the center portion comprising two arcuate keys for engaging the grooves of the two pipe ends; a first bolting portion, comprising a first bolt hole and a first coupling bolt pad; and a second bolting portion, comprising a second bolt hole and a second coupling bolting pad, wherein the interior surfaces of the first and second housing segments are facing each other, creating a center cavity. The gasket is located within the center cavity. The first bolt connecting the first and second housing segments through the first bolt holes of the first bolting portions of each of the first and second housing segments. The first nut is affixed to the first bolt. The second bolt connecting the first and second housing segments through the second bolt holes of the second bolting portions of each of the first and second housing segments. The second nut that can be adjusted along the second bolt. The hold open clip comprises: a top mounting portion located between a bolt head of the first bolt and the first bolting portions, wherein the top mounting portion comprises an opening that accommodates the first bolt and does not allow passage of the bolt; a bottom mounting portion located between the first nut and the first bolting portions, wherein the bottom mounting portion comprises an opening that accommodates the first bolt and does not allow passage of the first nut; and a middle portion connecting the top mounting portion and the bottom mounting portion comprising a strength reduced area of which a strength is reduced relative to a remaining area of the middle portion.

According to some aspects, the strength reduced area may comprise an area of which a cross section or a thickness is reduced relative to the remaining area of the middle portion. The strength reduced area may comprise a row of holes. The strength reduce area may be formed by reversely bending the middle portion for predetermined times. The top mounting portion may extend outward relative to the middle portion; and the bottom mounting portion may extend outward relative to the middle portion. The strength reduced area may break when the coupling is tightened. The hold open clip may be formed from at least one selected from a group comprising sheet metal, stamped metal, cast metal, machined plastic, and molded plastic.

In some aspects, a hold open clip comprises a single formed component, wherein the hold open clip comprises: a mounting portion comprising an opening that is configured to accommodate a bolt, wherein the opening is configured not to allow passage of a nut or a bolt head of the bolt; and a tab connected to a side of the mounting portion and having an outer edge; wherein the tab is bent relative to the mounting portion whiling extending away from the mounting portion, whereby the outer edge is located outside of the mounting portion.

According to some aspects, the mounting portion may be flat or bent. The tab may extend over a part of the side of the mounting portion. The tab may comprise a first tab and a second tab that are connected to opposite sides of the mounting portion. The tab may pivot away from the flat mounting portion when the hold open clip is pressed from an upper side or a lower side of the mounting portions. The mounting portion may be flattened when the hold open clip is pressed from an upper side or a lower side of the mounting portions. The hold open clip may be formed from at least one selected from a group comprising sheet metal, stamped metal, cast metal, machined plastic, and molded plastic.

In some aspects, a hold open clip comprises a single formed component, wherein the hold open clip comprises: a middle portion extending along a longitudinal axis and a width axis; a top mounting portion located at a proximal end of the longitudinal axis, wherein the top mounting portion comprises an opening that is configured to accommodate a bolt and not to allow passage of at least one of a nut and a bolt head of the bolt; a bottom mounting portion located at a distal end of the longitudinal axis, wherein the bottom mounting portion comprises an opening that is configured to accommodate the bolt and not to allow passage of at least the other one of the nut and the bolt head; and wherein the middle portion connects the top mounting portion and the bottom mounting portion and comprises a strength reduced area of which a strength is reduced relative to a remaining area of the middle portion.

According to some aspects, the strength reduced area may comprise an area of which a cross section or a thickness is reduced relative to the remaining area of the middle portion. The strength reduced area may comprise a row of holes. The strength reduce area may be formed by reversely bending the middle portion for predetermined times. The top mounting portion may extend outward relative to the middle portion; and the bottom mounting portion may extend outward relative to the middle portion. The hold open clip may be formed from at least one selected from a group comprising sheet metal, stamped metal, cast metal, machined plastic, and molded plastic.

In some aspects, an installation ready coupling configured for connecting two grooved pipe ends comprises: a first housing segment and a second housing segment, a gasket, a wedge, a first bolt, a first nut, a second bolt, a second nut. Each of the first and the second housing segments comprises: an arcuate center portion, wherein an interior surface of the center portion comprises two arcuate keys for engaging the grooves of the two pipe ends; a first bolting portion, comprising a first bolt hole and a first coupling bolt pad; and a second bolting portion, comprising a second bolt hole, an interior sloped surface, and a second coupling bolt pad; wherein the interior surfaces of the first and second housing segments are facing each other, creating a center cavity. The gasket is located within the center cavity. The wedge located between the interior sloped surfaces of the two second bolting segments. The first bolt connecting the first and second housing segments through the first bolt holes of the first bolting portions of each of the first and second housing segments. The first nut affixed to the first bolt. The second bolt connects the first and second housing segments through the second bolt holes of the second bolting segments of each of the first and second housing segments. The second nut is adjustable along the second bolt, wherein when the second nut is tightened, the first and second housing segments are pulled together, whereby the sloped surfaces of each of the two second bolting portions engages the wedge and urges the wedge to the center cavity of the coupling, so that the wedge engages the gasket, and each of the two arcuate keys engages the grooves of the two pipe ends.

According to some aspects, the first nut may be affixed to the first bolt at a fixed position. The wedge may be engaged with at least one of the coupling housing segments. The wedge may further comprise a bolt slot to accommodate the second bolt. The wedge may further comprise a flange comprising a bolt hole to accommodate the second bolt. The first bolting portion of the first housing segment and the first bolting portion of the second housing segment may be attached to each other through a hinge roller that allows the first and second housing segments to hinge on the hinge roller. The hinge roller may comprise: a male element positioned on a face of one of the two first bolting pads facing the other of the two first bolting pad, and a female element positioned on a face of the other first bolting pads facing the one of the two first bolting pads; and wherein the male element and the female element may engage with each other. The hinge roller may comprise a male element positioned at a side of one of the two first bolting portions and a female element positioned at the side of the other of the two first bolting portions; and wherein the male element and the female element may engage with each other. The male and female elements may be formed as a half cylinder. The hinge roller may engage the first housing segment with the second housing segment in a way to resist motion of the first and the second housing segments in the direction perpendicular to a pipe axis. The coupling may have an inner diameter less than or equal to 2.5 inches.

In some aspects, a gasket for use with an installation ready coupling configured to connect two grooved pipe segments comprises: a circular body portion, two primary seals, a center leg, and a plurality of tabs. The two primary seals are located on opposite ends of the body portion in the direction of center axis, each of the primary seals comprising a sealing lip extending toward the center axis of the body portion for a first distance, and then turning inward toward the center of the body portion while extending toward the center axis and gradually narrowing into a lip. The center leg protrudes inward from the interior surface of the body portion. The plurality of tabs are evenly distributed along the interior surface of the body portion.

According to some aspects, the center leg may not extend beyond the lips of the seals in the radial direction. Two bridges may be provided on opposite sides of the center leg and protrude outward. A relief pocket may be provided on the exterior of the body portion, wherein the body portion gradually narrows from each of the axial ends toward the center of the body portion, so that a cross-section along a radial direction of the body portion has a concave exterior surface. The tabs may extend beyond the seal lips in the radial direction toward the center axis. The tabs may be of rectangular or semicircular shape. The lips of the seals may be sized, so that, prior to tightening of the coupling, the lips contact the exterior surfaces of the pipe segments, while the bridges do not make contact to exterior surfaces of the pipe segments. When the coupling is tightened, the primary seal and the bridges may compress against the pipe segments, the center leg and the tabs may be located between the two pipe segments, and the tabs may not extend into an interior space of the pipe segments.

In some aspects, a gasket for use with an installation ready coupling configured to connect two grooved pipe segments comprises: a circular body portion, two primary seals, and a center stop leg. The two primary seals are located on opposite ends of the body portion in the direction of center axis, each of the primary seals comprising a sealing lip extending toward the center axis of the body portion for a first distance, and then turning inward toward the center of the body portion while extending toward the center axis and gradually narrowing into a lip. The center stop leg protrudes inward from the interior surface of the body portion. The center stop leg extend substantially the whole circle of the gasket. Two bridges provided at the opposite sides of the center leg extend toward the center axis of the gasket and form respective steps between the bridges and the center leg.

According to some aspects, each of the bridges may be tapered towards its end. Each of the seal may further comprise a concave on an outer side.

BRIEF DESCRIPTION OF DRAWINGS

FIGS. 8A and 8B illustrate a front view and a perspective view of the coupling in the preassembled state according to another embodiment, wherein FIG. 8B depicts the coupling without showing the gasket;

FIGS. 18A and 18B illustrate partial cut-out views of the gasket according to one embodiment at respective positions provided without and with a stop tab.

DETAILED DESCRIPTION

A hold open clip is proposed that positions the coupling housings in a spaced apart relation such that the housings may accept the pipe segments without relying on the gasket outer diameter (OD) to space the housing segments. This also allows for the use of a large diameter gasket and avoids deformation during installation.

The hold open clip is comprised of one or more components which maintain a relatively attached position of the coupling housings in relation to one another. The gasket is then allowed to float freely within the two housing segments.

FIGS. 1-3 depict one embodiment of the hold open clip 10. In one embodiment, as shown in FIGS. 1A and 1B, the hold open clip 10 is comprised of a single formed sheet metal component. The hold open clip 10 comprises a mounting portion 12 and tabs 14 and 16. The mounting portion 12 extends substantially in a longitudinal direction y and a width direction x and comprises a bolt hole 18. As shown in FIGS. 1A and 1B, the bolt hole 18 is oblong. In another embodiment, the bolt hole 18 can be round, oval, or of any other desirable shape. The bolt hole 18 is configured to accommodate a corresponding bolt without allowing passage of the bolt head or the nut. In one embodiment, the mounting portion 12 is substantially rectangular. One side of the mounting portion 12 in the longitudinal direction y is curved. In another embodiment, the mounting portion may be a square, trapezoid, oblong, oval, polygon, or any other desirable shape. The hold open clip 10 may be formed from stamped metals, cast metals (including steel or ductile iron), or machined or molded plastics.

Figure 1A:
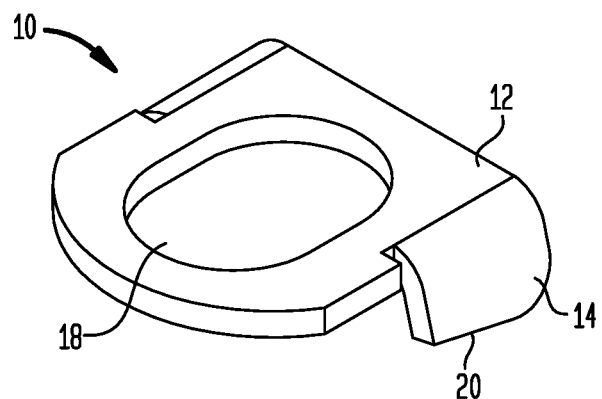
FIGS. 1A-1D illustrate a perspective view, a plan view, a side view and a front view of a hold open clip according to one embodiment.
Figure 1B:
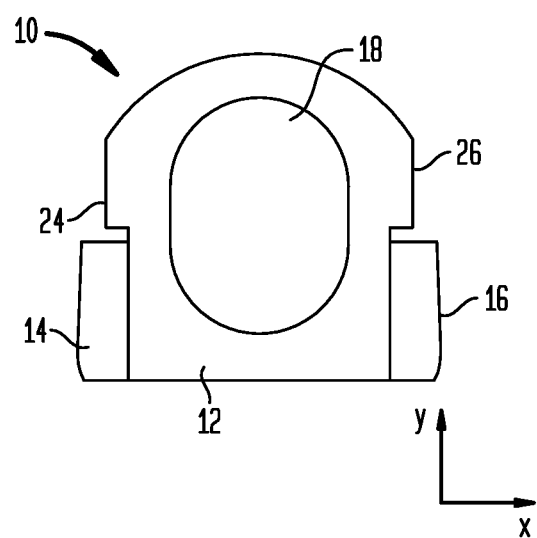

As shown in FIG. 1B, each of the tabs 14 and 16 is connected to a corresponding one of the sides 24 and 26 of mounting portion 12 in the width direction x. The tabs 14 and 16 extend at least a part of the length of the corresponding sides 24 and 26. In another embodiment, the tab may be connected to any other sides of the mounting portion, and more or less number of tabs can be provided. For example, in further another embodiment, only one side of the mounting portion, for example, in the longitudinal direction y is provided with a tab. In yet another embodiment, the tab also extends full length of the corresponding side of the mounting portion.

The tabs 14 and 16 each comprise outer edges 20 and 22. As shown in FIG. 1D, the tabs 14 and 16 are bent relative to the mounting portion 18 while extending away from the mounting portion 18, so that the outer edges 20 and 22 are positioned outside of mounting portion 18 in the longitudinal or width direction. Therefore, the overall extending direction of tabs 14 and 16 from its connection with the mounting portion 18 to the respective outer edges 20 and 22 forms an acute angle β with the overall extending direction of the mounting portion 18 from side to side (for example, the longitudinal direction or width direction). In this embodiment, since the tabs 14 and 16 are connected to the opposite sides of the mounting portion 18 in the with direction x, the acute angle β is formed by the direction x and the extending direction of the tabs 14 and 16 as shown in FIG. 1D. The tabs 14 and 16 are bent at their respective connection to the mounting portion 18. However, in another embodiments, the tabs may be bent at another location, such as in the middle of a tab. The tabs may also bend at more than one locations. Furthermore, in the one embodiment, the tabs 14 and 16 are bent in the same direction. However, in another embodiment, the tabs may bend in different directions relative to one another, for example, in opposed directions.

Figure 1C:
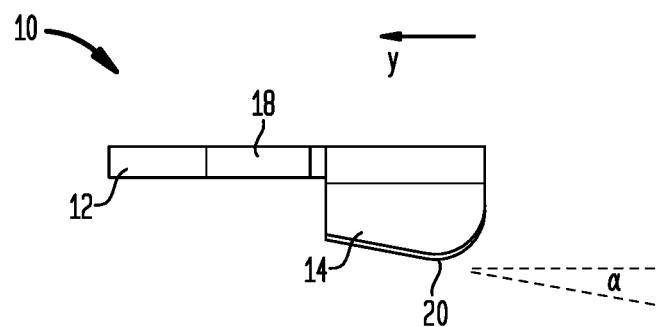
Figure 1D:
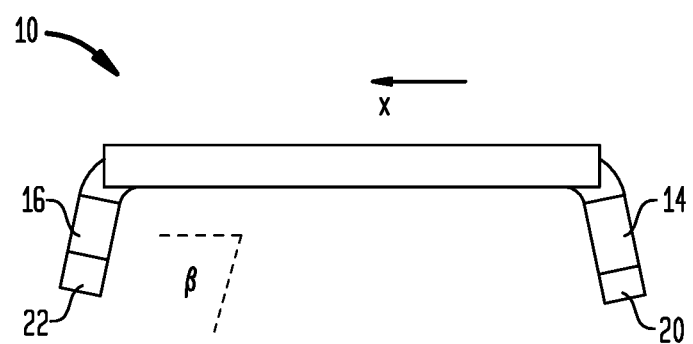

As shown in FIG. 1C, the outer edges 20 and 22 (only the edge 20 is shown) of the tabs 14 and 16 (only the tab 14 is shown) are sloped relative to the overall extending direction of the mounting portion 18 (in this embodiment, the longitudinal direction y) and forms an angle α with the overall extending direction. In the one embodiment, the angle α is acute. The angle α between the outer edges of the tabs and the mounting portion varies for each size and profile of couplings in order to provide sufficient clearance for pipe segment insertion when the hold open clip is assembled on an exemplary coupling in the pre-installation open position, which will be described in detail hereafter.

Figure 2A:
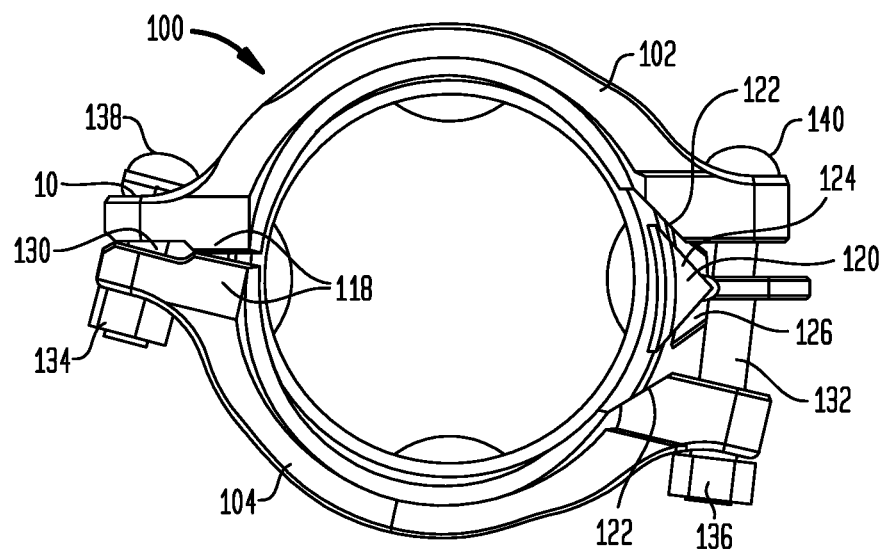
FIGS. 2A-2C illustrate a front view, a perspective view, and a sectional view of a coupling in the preassembled state according to one embodiment.
Figure 2B:
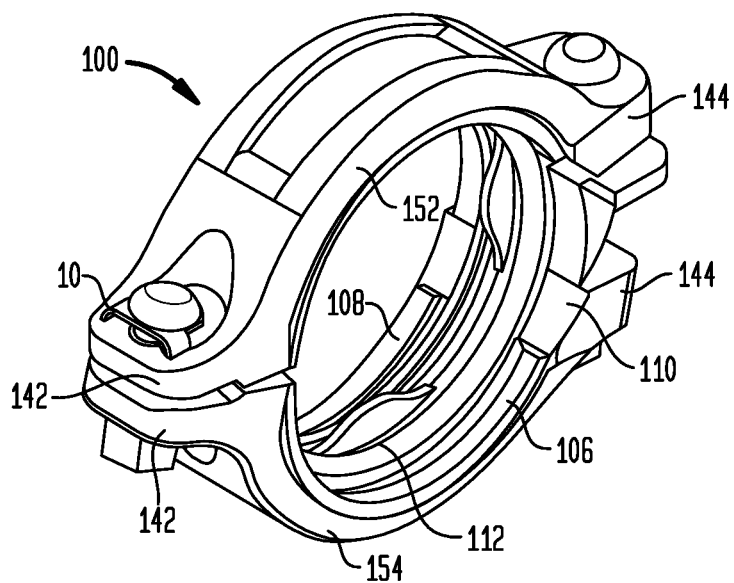
Figure 2C:
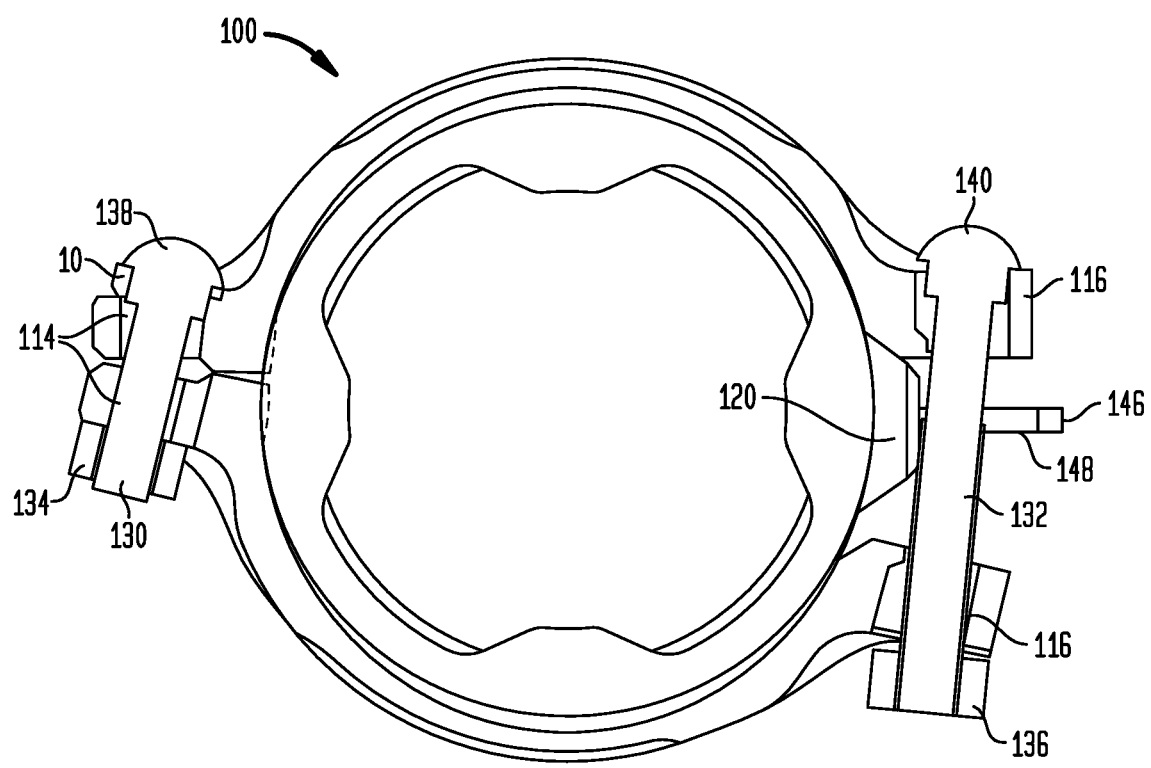

FIGS. 2 and 3 illustrate the installation ready coupling according to one embodiment. FIGS. 2A-2C illustrate a front view, perspective view, cross section view of the coupling 100 in the preassembled state ready for installation onto a pair of grooved pipe ends (not shown). The coupling 100 comprises two housing segments, that is, the first housing segments 102 and the second housing segment 104. The two housing segments may be symmetric or substantially symmetric, or even identical or substantially identical. Each of the housing segments 102 and 104 comprises an arcuate or generally semicircular main portion or center portion 152 or 154, as shown in FIG. 2B. Each of the housing segments 102 and 104 includes a generally semicircular or arcuate interior surface 110 that comprises two interior arcuate keys 106 and 108, as shown in FIG. 2B, located on the outer rims that engages the grooves of the pipe ends when tightened. A gasket 112 is seated in the space between the two keys 106 and 108. As shown in FIG. 2B, each of the housing segments 102 and 104 also comprises a first bolting portion 142 with a first bolt hole 114 and a second bolting portion 144 with a second bolt hole 116 on the respective opposed ends. Each of the first and second bolting portions 142 and 144 are formed as a bolting ear or bolting flange protruding outward at the respective ends of the coupling 100. The first and second coupling bolt pads 118 are located on the inward facing side of the respective first and second housing segments 102 and 104. The coupling bolt pad 118 of one housing segment 102 or 104 can make contact with corresponding coupling bolt pad of the other housing segment 104 or 102 in the assembled coupling when the bolts are tightened. Each of the housing segments further comprises a sloped surface 122 on one end, which may be opposed to the end where the bolt pads 118 are provided. A floating wedge 120 is located between the two sloped surfaces 122 of the first and second housing segments 102 and 104. When the bolts are tightened, the sloped surfaces 122 of the housing segments 102 and 104 can push against the respective sloped sides 124 and 126 of the floating wedge 120, and urge the wedge 120 towards the center of the coupling 100.

Two bolts 130 and 132 are installed on the coupling. The first bolt 130 is accommodated by the first bolt hole 114. The first bolt hole 114 of the first housing segment 102 does not allow passage of the bolt head 138, while the first bolt hole 114 of the second hosing segment 104 does not allow passage of the first nut 134. The second bolt 132 is accommodated by the second bolt hole 116. Likewise, the second bolt hole 114 of the first housing segment 102 does not allow passage of the bolt head 140, while the second bolt hole 116 of the second hosing segment 104 does not allow passage of the first nut 134.

In this embodiment, in the preassembled state, the first bolt 130 allows the coupling segments 102 and 104 to pivot about the end of the coupling, more specifically, about the position of the bolt pads 118 where the first and second coupling segment 102 and 104 come into contact with each other. The first bolt 130 is typically shorter and is torqued appropriately in the preassembled state. The second nut 136 on the wedge end is loosened to the end of its travel, the grooved coupling partially hinges open and the wedge moves outward in order to accept the grooved pipe end. The hold open clip 10 is inserted between the bolt head 130 and the first hosing segment 102. In another embodiment, the hold open clip 10 may also be inserted between the nut 134 and the first housing segment 102. The thickness of the hold open clip 10, as a result of the bent tab, limits the travel of the first and second coupling segments along the first bolt 130. The first and second coupling segments are pushed closer at the end of the first bolt 130, thus making the end of second bolt 130 open wider. This makes it easier for an end user to attach the pipe ends into the coupling.

When the outer edge 20 (see FIG. 1C) of the tab 14 of the clip 10 is slopped, it is preferable to insert the clip 10 with the wider end of the tab 14 (the thicker end of the clip 10) positioned far away from the center of the coupling 100, as shown in FIGS. 2A and 2B. By this arrangement, the clip 10 may keep the distal ends at the first bolt side of the housing segments 102 and 104 closer to each other, thus making the other ends at the second bolt side of the housing segments 102 and 104 opened wider.

Therefore, the hold open clip geometry provides a surface that the hinge bolt, that is, the first bolt 130 may be tightened against. The hinge bolt tightening is typically performed as part of the manufacturing process. In this way, an end user is not required to adjust the hinge bolt during field installation processes. The nut of the hinge bolt may be capped to prevent accidental adjustment.

One of the proposed features of the hold open clip is to act as a binary indicator of installation status. The clip includes at least one bent tab that is designed to get flattened when the adjustable bolt is tightened during installation. Before being flattened, the bent tab indicates a coupling that has not been tightened. The installation process will flatten the hold open clip tabs and the flattened tabs would indicate a coupling that has been properly installed.

Figure 3A:
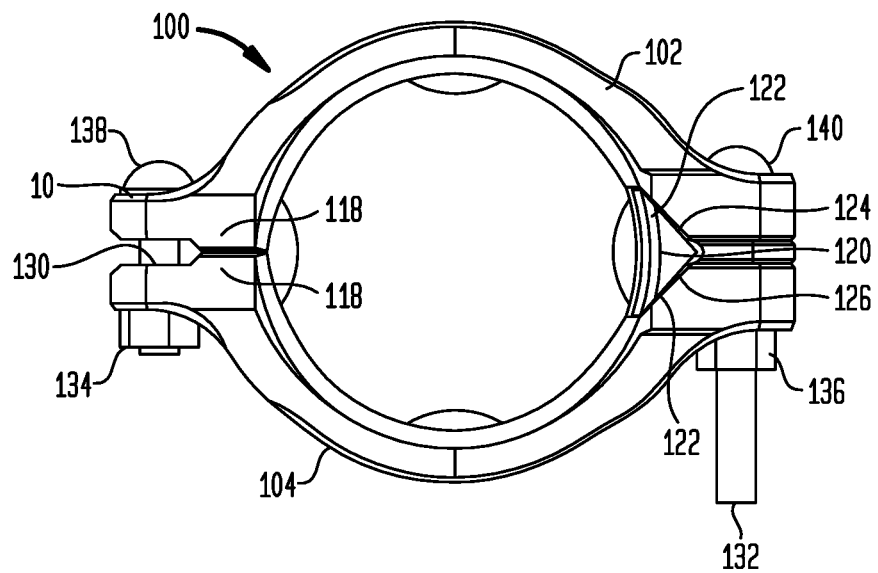
FIGS. 3A-3C illustrate a front view, a perspective view, and a side view of the coupling shown in FIGS. 2A-2C in the assembled state.
Figure 3B:
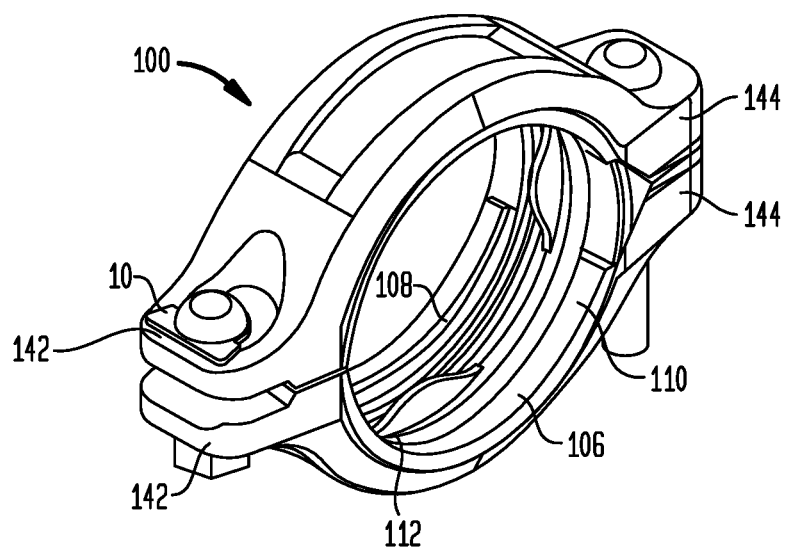
Figure 3C:
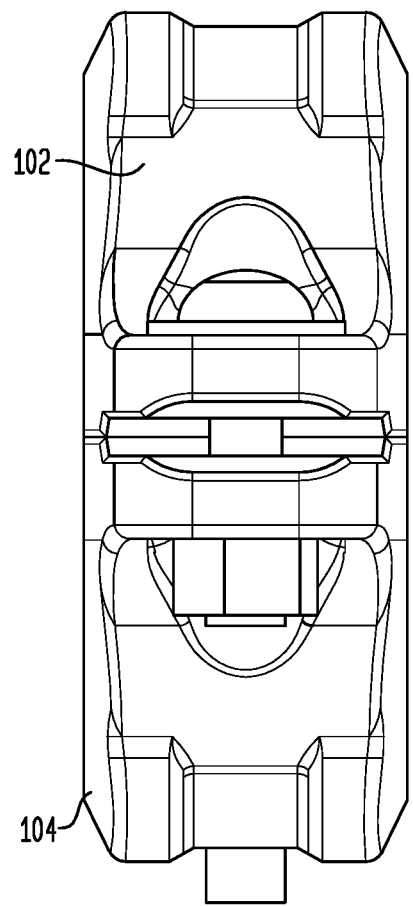

During installation, the adjustable bolt 132 of the coupling is tightened. This results in a tensile load being applied to the clip, which is located on the opposite end (i.e. on the hinge side of the coupling) from the adjustable bolt. The tensile load acts to flatten the hold open clip 10. FIGS. 3A-3C illustrate a front view, perspective view, and side view of the coupling 100 in the assembled state with flattened hold open clip 10.

As shown in FIGS. 3A-3C, the second bolt 132 is completely tightened. Therefore, the sloped surfaces 122 of the housing segments 102 and 104 push against the respective sloped sides 124 and 126 of the floating wedge 120, and urge the wedge 120 towards the center of the coupling 100. The first and second housing segment 102 and 104 contact with each other at the pads 118. Since the first and second housing segment 102 and 104 pivot around the pads 118 as the fulcrum, the first and second house segment 102 and 104 become far away from each other at the end of the first bolt 130 along with that they become closer at the end of the second bolt 132. The hold open clip 10 is thus pressed between the first bolt 130 (more specifically, the bolt head 138 in this embodiment) and the housing segment 102. The tabs 14 and 16 bend outwards from their initial position until the hold open clip 10 becomes flat, as shown in FIGS. 3B and 3C. The flattened clip 10 signals to the end user that the coupling has been tightened in position. In its flattened position, the hold open clip 10 preferably does not protrude outside of the footprint of the housing. This ensures that the hold open clip does not snag on objects or installers.

Once the coupling installation process is complete, the hold open clip is retained by the bolt and remains on the coupling for the lifetime of that installation. No material is discarded during the installation process. This ensures a clean working environment and worker safety since the hold open clip is contained. The hold open clip may be colored in order to be more visionally recognizable or to provide additional identification features to help an end user to parameters of the coupling, such as rigid or flexible couplings, gasket materials, etc.

The hold open clip provides many advantages including holding the coupling apart to facilitate insertion of piping segments. The hold open clip also allows for use of a larger gasket without the coupling housing resting on the gasket outside diameter. The hold open clip additionally indicates the installation status of the coupling. The hold open clip may be used to identify features of the gasket and/or the coupling with which it is assembled, for example, the gasket material or rigid vs. flexible coupling design.

Figure 4A:
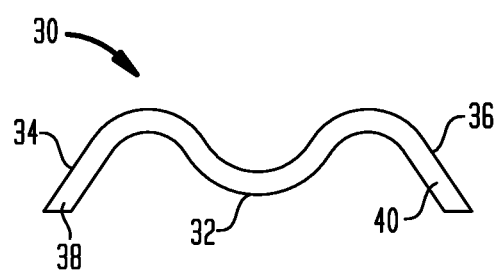
FIGS. 4A and 4B illustrate a front view and a bottom view of a hold open clip according to an alternative embodiment.
Figure 4B:
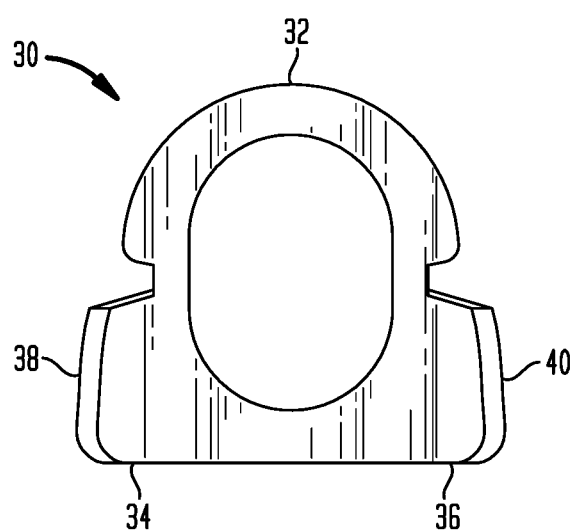

FIGS. 4A and 4B illustrate a front view and a bottom view of the hold open clip 30 according to an alternative embodiment. The hold open clip 30 is substantially the same as the hold open clip 10 except that the mounting portion 32 of the hold open 30 is bent instead of flat. As shown in FIG. 4A, the mounting portion 32 is bent into an arc like shape. The tabs 34 and 36 are connected to corresponding opposite sides of the mounting portion 32 and bent relative to the mounting portion 32. The tabs 34 and 36 extend away from the mounting portion 32, such that their respective outer edge 38 and 40 are located outside of the mounting portion 32. In another embodiment, the mounting portion 32 may be bent at more than one positions so as to form a corrugated profile.

The hold open clip 30 can be similarly mounted to a coupling in a preassembled state and become flattened when the coupling is tightened in place. The hold open clip according to this alternative embodiment thus provides similar advantages.

FIGS. 5A-5D illustrate a hold open clip 50 according to another alternative embodiment. FIGS. 5A-5D illustrate a perspective view, a plan view, a front view, and a side view of the hold open clip 50.

Figure 5A:
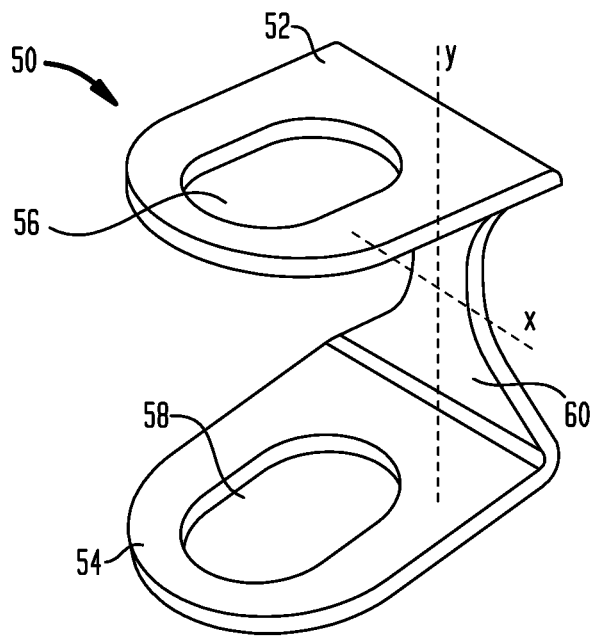
FIGS. 5A-5D illustrate a perspective view, a plan view, a front view, and a side view of a hold open clip according to another alternative embodiment.
Figure 5B:
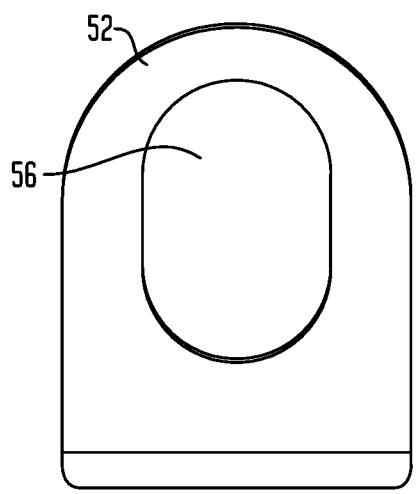
Figure 5C:
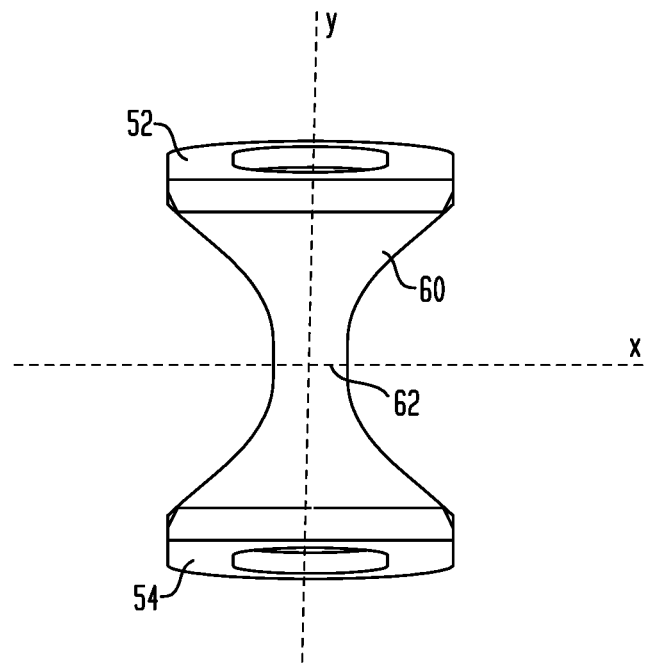
Figure 5D:
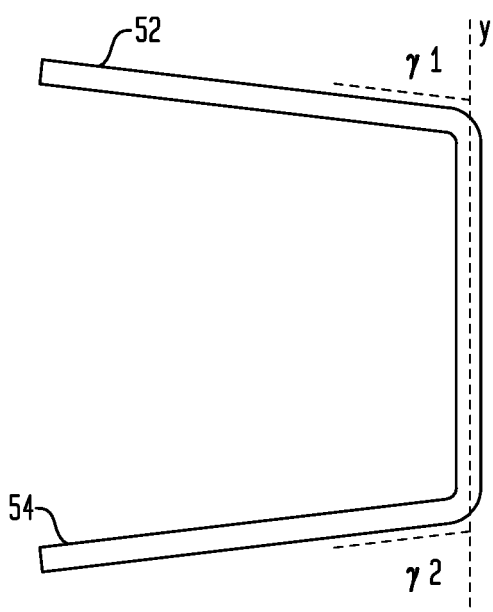

As shown in FIG. 5A-5D, the hold open clip 50 comprises a top mounting portion 52, a bottom mounting portion 54, and a middle portion 60. The middle portion 60 extends along a longitudinal axis y and a width axis x. The top mounting portion 52 is positioned at the proximal end of the longitudinal axis x and the bottom mounting portion 54 is positioned at the distal end of the longitudinal axis x. The top mounting portion 52 comprises a bolt opening 56 while the bottom mounting portion comprises a bolt opening 58. The middle portion 60 connects the top mounting portion 52 and the bottom mounting portion 54. The hold open clip 50 is thus formed like the letter U. As best shown in FIG. 5D, the top mounting portion 52 extends outward relative to the middle portion 60, and thus forms an acute angle γ1 with the extension of the longitudinal axis y. Similarly, the bottom mounting portion 54 extends outward relative to the middle portion 60, and thus forms an acute angle γ2 with the extension of the longitudinal axis y.

The top mounting portion 52 comprises a top bolting hole 56 which accommodates a corresponding bolt but does not allow passage one of its bolt head and nut, while the bottom mounting portion 54 comprises a bottom bolting hole 58 which accommodates the corresponding bolt but does not allow passage of the other of its bolt head and nut.

The middle portion 60 comprises a strength reduced area 62 that is configured to have a reduced strength relative to the remaining area of the middle portion 60. The strength reduced area 62 is capable of elongating or breaking under a predetermined load.

As shown in FIG. 5C, the strength reduced area 62 is an area with a smaller cross section than the other area. The strength reduced area 62 can be formed by removing or cutting off some material from the material sheet of the middle portion, for example. In this embodiment, the middle portion 60 comprises a tapered cross section from two opposite ends towards the center. In another embodiment, the middle portion 60 may comprise a shape with abruptly reduced cross section at the area 62. In yet another embodiment, the strength reduced area 62 may be provided at a position other than the center of the middle portion 60.

In another embodiment, the strength reduced area may be an area with a reduced thickness relative to the remaining area. In further another embodiment, the strength reduced are may be formed by a row of holes. In this case, the middle portion is formed like imperforated stamps. In yet another embodiment, the strength reduced area can be formed by bending the middle portion along a line for predetermined times so that the material around the line is relative fatigued and thus easier to break than the other area.

The hold open clip 50 may be formed from stamped metals, cast metals (including steel or ductile iron), or machined or molded plastics.

Figure 6A:
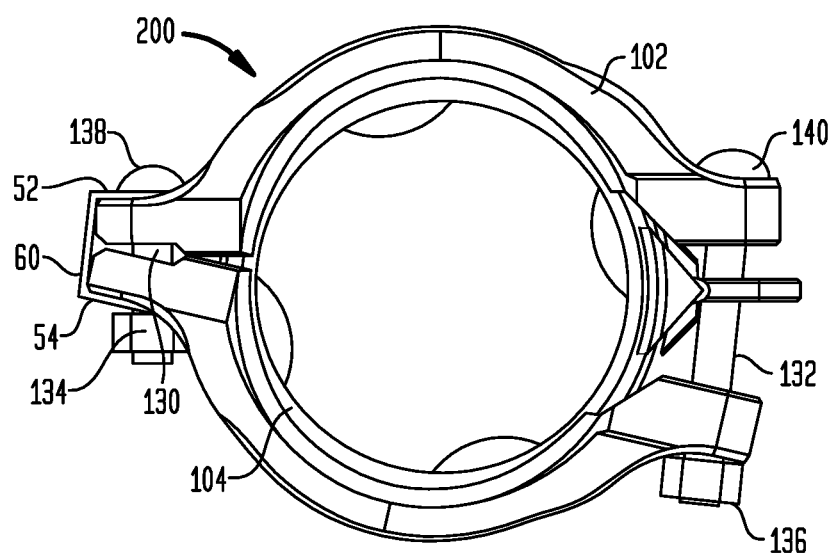
FIGS. 6A and 6B illustrate a front view and a perspective view of a coupling in the preassembled state according to another alternative embodiment.
Figure 6B:
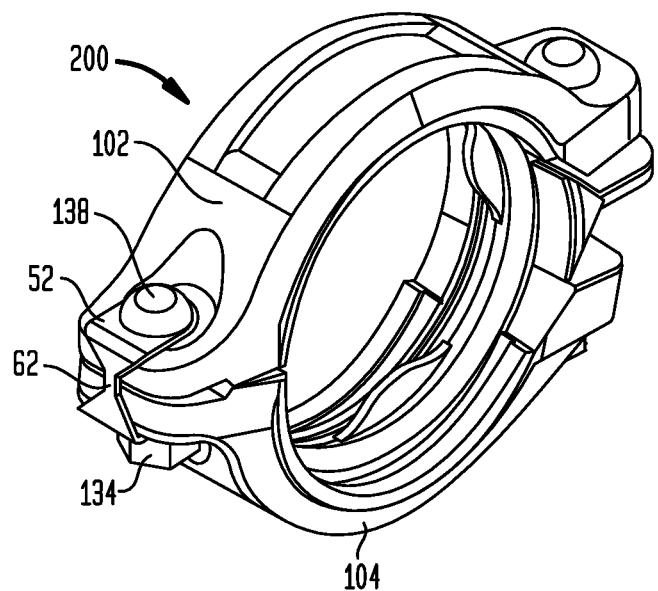
Figure 7A:
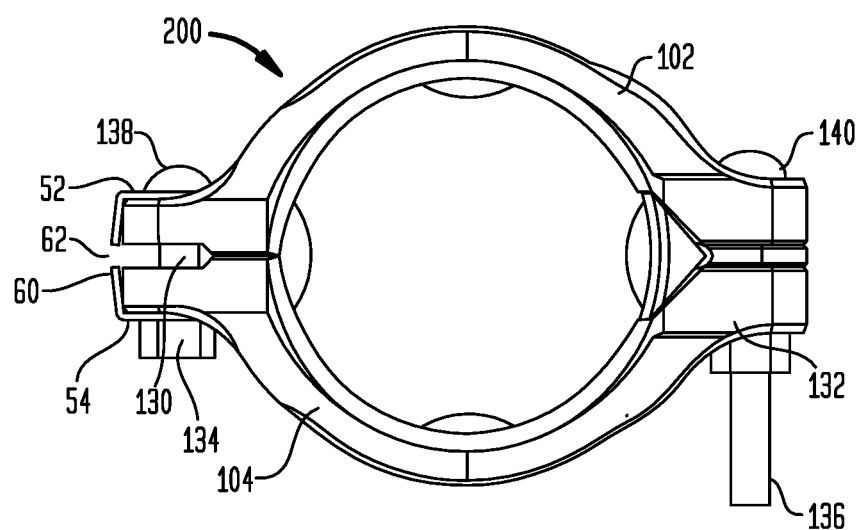
FIGS. 7A and 7B illustrates a front view and a perspective view of the coupling shown in FIGS. 6A and 6A in the assembled state.
Figure 7B:
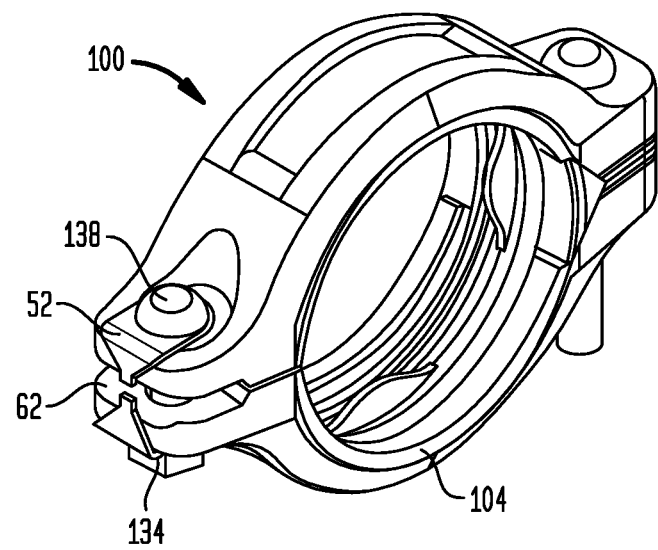

FIGS. 6 and 7 illustrate the installation ready coupling 200 according to another alternative embodiment. FIGS. 6A and 6B illustrate a front view and perspective view of the coupling 200 in the preassembled state ready for installation onto a pair of grooved pipe ends (not shown). FIGS. 7A and 7B illustrate a front view and perspective view of the coupling 200 in the assembled state.

The coupling 200 is substantially the same as the coupling 100 except that the hold open clip 10 is substituted with the hold open clip 60. As show in FIGS. 6A and 6B, in a preassemble state, the top mounting portion 52 is inserted between a bolt head 138 of the first bolt 130 and the first bolting portion 142 of the first housing segment 102. The bottom mounting portion 54 is inserted between the nut of the first bolt 130 and the first bolting portion 142 of the second housing segment 104. As shown in FIG. 6A, when the first bolt 130 is tightened in position in the preassemble state. The hold open clip 60 keeps the ends of the first bolting portions 142 of the first and second housing segments 102 and 104 closer to each other. Hinging on the first bolt side, the first and second housing segments 102 and 104 open wide. This makes it easier for an end user to attach the pipe ends into the coupling.

The mounting portions 52 and 54 extend outward relative to the middle portion 60. In this case, therefore, the geometry of the hold open clip 50 makes the distance between the two first bolting portions 142 become smaller towards the ends of the first bolting portions 142. This also facilitate to keep the other side of the coupling open wider. The outward extending angle of the mounting portions thus provides sufficient clearance for pipe segment insertion.

Another one of the proposed features of the hold open clip is to act as a binary indicator of installation status. During installation, the adjustable bolt 132 is tightened. This results in a tensile load being applied to the hold open clip, which is located on the opposite bolting portions from the adjustable bolt (i.e. on the hinge side of the coupling). After tightening of the adjustable bolt, the coupling is in the assembled position. FIGS. 7A-7B illustrate a front view and a perspective view of the coupling 200 in the assembled state with the hold open clip broken.

As shown in FIGS. 7A and 7B, the second bolt 132 is completely tightened. The first and second housing segment 102 and 104 contact with each other at the pads 118. Since the first and second housing segment 102 and 104 pivot around the pads 118 as the fulcrum, the first and second house segment 102 and 104 become far away from each other at the end of the first bolt 130 along with that they become closer at the end of the second bolt 132. The strength reduced area of the hold open clip cannot bear the tensile load and thus ensures the hold open clip breaks in a reliable manner and location. Once the hold open clip fractures and breaks apart, the two resulting pieces are retained by the bolt and may remain on the coupling for the lifetime of that installation. No material is discarded during the installation process. This ensures a clean working environment and worker safety since all pieces of the hold open clip are contained. The hold open clip may be colored in order to provide additional identification features help an end user to parameters of the coupling, such as rigid or flexible couplings, gasket materials, etc. The broken clip also provides a visual indication to an end user that the coupling is tightened in position.

The hold open clip in this embodiment also provides many advantages including holding the coupling apart to facilitate insertion of piping segments. The hold open clip also allows for use of a larger gasket without the coupling housing resting on the gasket outside diameter. The hold open clip additionally indicates the installation status of the coupling. The hold open clip may be used to identify features of the gasket and/or the coupling with which it is assembled, for example, the gasket material or rigid vs. flexible coupling design.

Figure 8A:
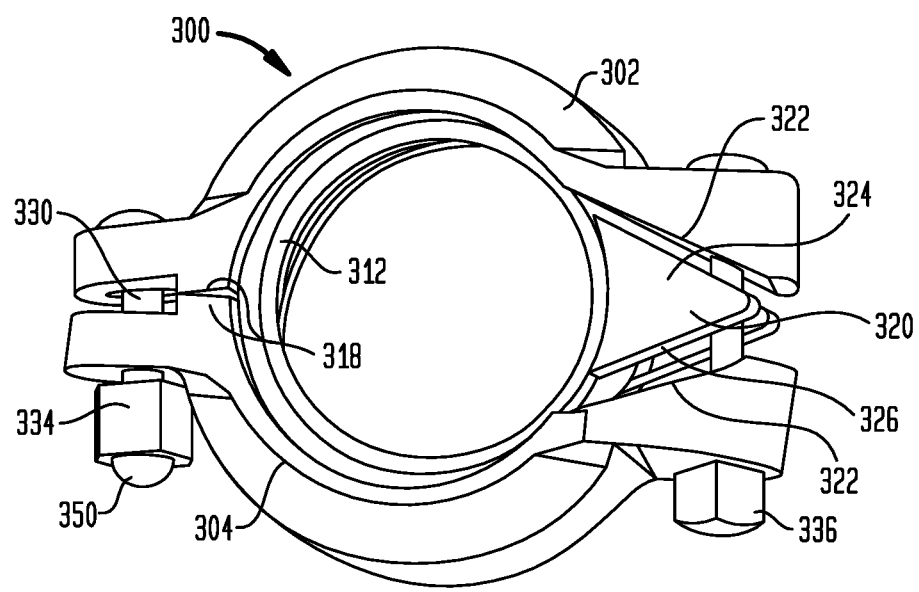
Figure 8B:
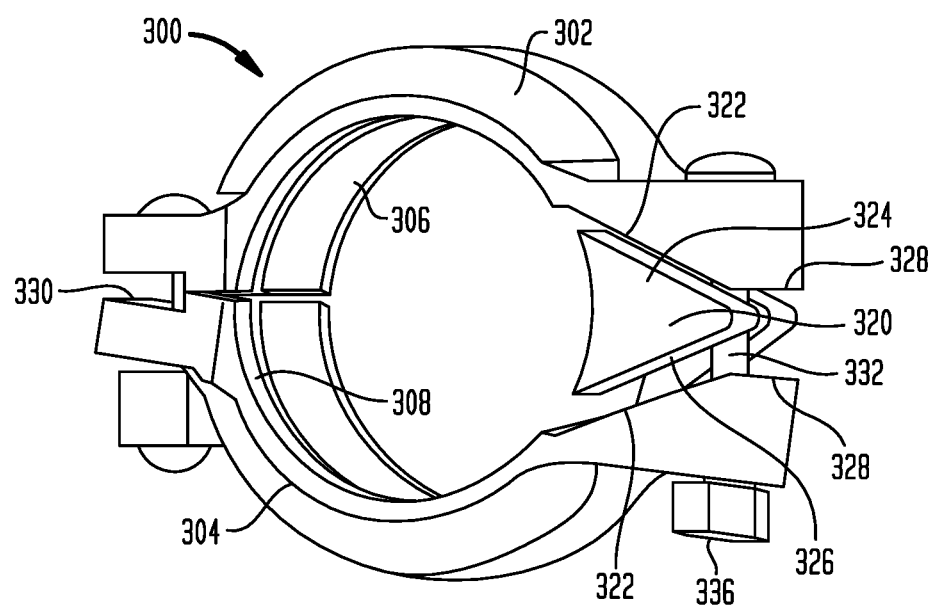
Figure 9:
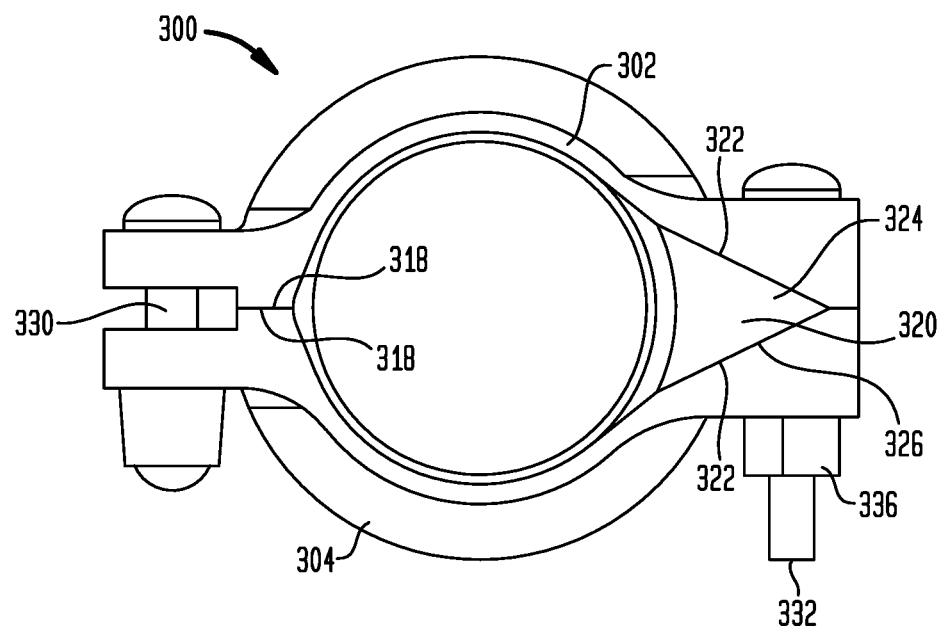
FIG. 9 illustrates a front view of the coupling shown in FIGS. 8A and 8B in the assembled state.
Figure 10:
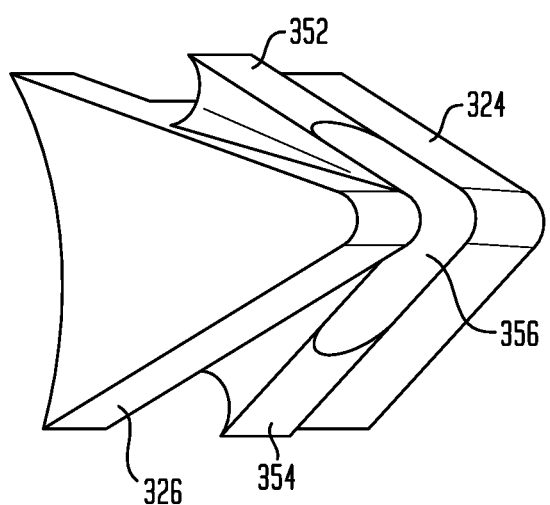
FIG. 10 illustrates a perspective view of the wedge according to another embodiment.

FIGS. 8-10 illustrates a novel installation ready coupling according another embodiment that seeks to improve upon existing installation ready couplings by reducing the complexity and manufacture cost of the housing structure while providing comparable or superior performance in constraining piping systems and providing fluid seals.

FIGS. 8A and 8B illustrates the installation ready coupling 300 in the preassembled state ready for installation onto a pair of grooved pipe ends (not shown). Similar to the coupling 100 aforementioned, the coupling 300 comprises a first and second housing segments 302 and 304 that are arcuate or generally semicircular. The two housing segments 302 and 304 can be symmetric or substantially symmetric, or identical or substantially identical. Each of the housing segments 302 and 304 has a generally semicircular interior surface that comprises two interior keys 306 and 308 located on the outer rims that engages the grooves of the pipe ends when tightened. A gasket 312 is seated in the space between the two keys 306 and 308. Each of the housing segments 302 and 304 also comprises a first bolting portion 342 with a first bolt hole and a second bolting portion 344 with a second bolt hole on the respective opposed ends. Each of the first and second bolting portions 342 and 344 are formed as a bolting ear or bolting flange protruding outward at the respective ends of the coupling 300. The first and second coupling bolt pads 318 and 328 are located on the inward faces of the respective housing segments 302 and 304 on the opposite sides. These coupling bolt pads 318 and 328 of one housing segment 302 or 304 can make contact with corresponding coupling bolt pads 318 and 328 of the other housing segment 304 or 302 in the assembled coupling when the bolts are tightened. Each of the housing segments further comprises a sloped surface 322 on one end. A floating wedge 320 is located between the two sloped surfaces 322 of the housing segments 302 and 304. When the bolts are tightened, the sloped surfaces 322 of the housing segments 302 and 304 can push against the sloped sides 324 and 326 of the floating wedge 320, and urge it toward the center of the coupling 300.

Two bolts 330 and 332 are installed on the coupling. In this embodiment, the first bolt 330 allows the first and second segments 302 and 304 to pivot about this end of the coupling around the first bolt 330 (that is, hinge side), when the second bolt 332 has not been tightened. The first bolt 330 is shorter, and preassembled and tightened appropriately. In this embodiment, the first nut 334 for the first bolt 330 is covered by a protective cap 350 to prevent the customer from tightening it. The second bolt 332 is provided on the wedge side, and is used for installing and removing the coupling 300.

With the second nut 336 on the wedge side (the second bolt 332) is loosened to the end of its travel, the coupling segments 302 and 304 partially hinges open and the wedge 320 moves outward in order to accept the grooved pipe end. When the second nut 336 is tightened, the coupling segments 302 and 304 hinge close and pushed the wedge 320 towards the center of the coupling 300. This results in two states: one is open configuration as shown in FIGS. 8A and 8B, i.e., preassembled state in which the coupling is ready for installation; and the other is closed configuration as shown in FIG. 9, i.e., assembled state in which the coupling is tightened around pipe ends for use. In the open configuration, the interior gasket 312 floats between the two coupling housing segments 302 and 304 and the wedge 320. Each housing segment has geometry designed to engage the appropriately sized gasket OD. To facilitate installation, the bolt 332 on the wedge side can be loosened, which may be done prior to shipping to the job site, e.g., at the manufacturing facility. This allows the wedge to freely move outward perpendicular to the pipe's axis, so as to increase the overall internal diameter of the coupling and facilitate installation onto the pipe. In this embodiment, the wedge 320 does not have to grab the groove on the pipe, i.e., lacks corresponding keys to engage the grooves on the pipe. It supports the gasket only and allows an easier installation on to the pipe. Then the end user may make the first bolt pads 318 of the first and second housing segments 302 and 304 to align and contact with each other, position the coupling 300 on two grooved pipe ends, and tighten one bolt (the second bolt 332) and the coupling is thus installed. As shown in FIG. 9, in the close configuration, the second pads 328 of the first and second housing segments 302 and 304 also align and can make contact with each other. The wedge 320 is engaged between the first and second housing segments 302 and 304 with its sloped sides 324 and 326 matching with the sloped surfaces 322. To discourage the customer from tampering with the hinge side bolt on the other side, that is the first bolt 330, it is covered with a protective cap so a standard wrench won't fit.

When in the open configuration as shown in FIG. 8A, the housing segments 302 and 304 are held apart by the uncompressed gasket, or other means, such as the previously disclosed hold up clips. As the second bolt 332 is tightened, the housing segments 302 and 304 are drawn together and the wedge 320 is moved inward. The housing segments 302 and 304 pivot about the integral hinge formed at the first bolt side (i.e., the first bolt 330 or a contact point between the housing segments around the first bolt 330), and uniformly compressing the gasket inward to provide a leak tight seal against the OD surface of the pipe ends being coupled.

The geometry for the bolted sides of the coupling are designed so that the housing bolt pads fully contact when the coupling is properly torqued during installation. More specifically, the two first pads 318 contact and match with each other, the two second pads 328 contact and match with each other, and the two sloped sides of the wedge 320 contact and match with the corresponding sloped surfaces 324 and 326 of the housing segments 302 and 304. This ensures proper installation and eliminates the need for torque wrenches during installation. This results in a visual indicator for the installer when tightening the coupling.

The coupling is designed such that deformation of the housings is not required for satisfactory performance of the coupling.

Figure 15A:
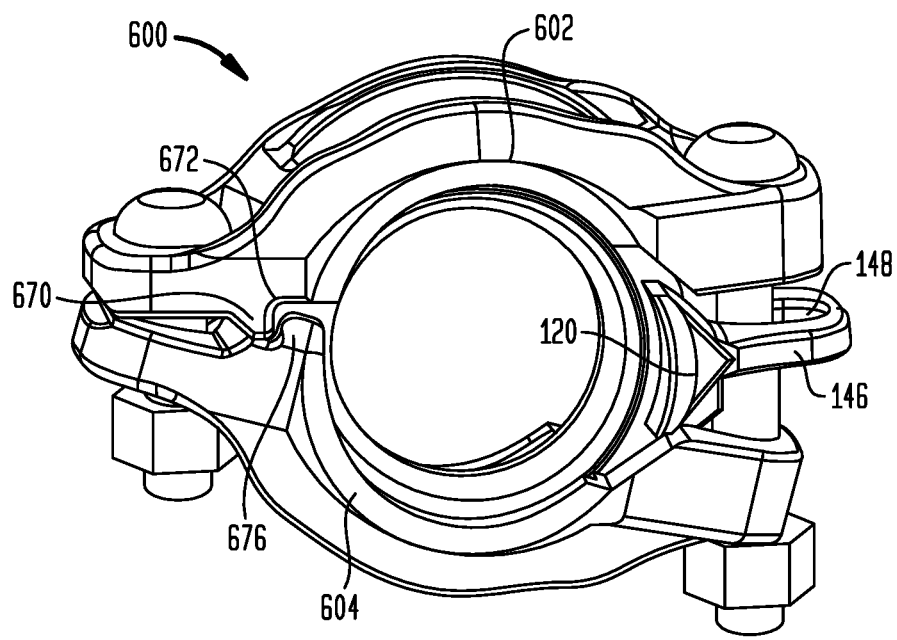
FIGS. 15A and 15B illustrate perspective views of the coupling according to the alternative embodiment in the preassembled state and the assembled state respectively.

As shown in FIG. 10, the wedge 320 further comprises keys 352 and 354 and a bolt slot 356. The bolt slot 356 allows passage of the second bolt 332. The keys 352 and 354 protrude towards the first and second housing segments 302 and 304, respectively, and engage with slots (not shown) in the first and second housing segments 302 and 304, respectively. When the coupling 300 is in the open configuration, the wedge 320 stay engaged with the housing segments 302 and 304 through the keys 352 and 354. In this embodiment, the keys 352 and 354 are formed with slopped surfaces that extend at a larger angle than the sides of the wedge 320. In yet another embodiment, the wedge may also comprise a bolt hole instead of a bolt slot to allow passage of the bolt and to further ensure secure assembly of the coupling, as shown in FIGS. 2C and 15A. As shown in FIGS. 2C and 15A, the wedge 120 may further comprise a flange 146 with the bolt hole 148. In another embodiment, the wedge may comprise the bolt hole within its main body without the flange.

This embodiment of coupling provides "stab" style installation while requiring only one bolt to be tightened during installation. The other bolt is installed to a preset location and a cap is installed over the nut to discourage the end user from tightening or loosening this bolt as it doesn't need to be adjusted during installation. This provides an advantage over other couplings which require multiple bolts be tightened or adjusted during installation. Using only three coupling housing components, including the two housing segments and a wedge, to obtaining those advantages maintains the low weight of traditional couplings, when compared to designs utilizing four or more housing bodies. Therefore, the coupling also avoids the increased weight which is a burden in installation.

Stab installation style, i.e., to attach the coupling in open configuration onto one pipe end, then insert the second pipe end into the seated coupling, and then tighten one bolt, saves installation time, and thus reduces labor cost in comparison to traditional designs.

The bolt hinge of the shown embodiment is easier to manufacture than the integral cast hinge design. The hinge is also superior to four-piece coupling in that it reduces assembly time, manufacture cost and complexity. The three-piece housing design of the present invention is more cost effective to produce when compared to other modern couplings that utilize four or more housing pieces to accomplish the "stab" installation feature.

FIGS. 10-13 illustrate a hinger roller according to another embodiment that may be applied to the couplings of the previously disclosed embodiments or other stab style coupling when appropriate. In this embodiment, the installation ready coupling is similar to the coupling in the aforementioned embodiments except that the coupling further comprises a hinge roller.

Figure 11A:
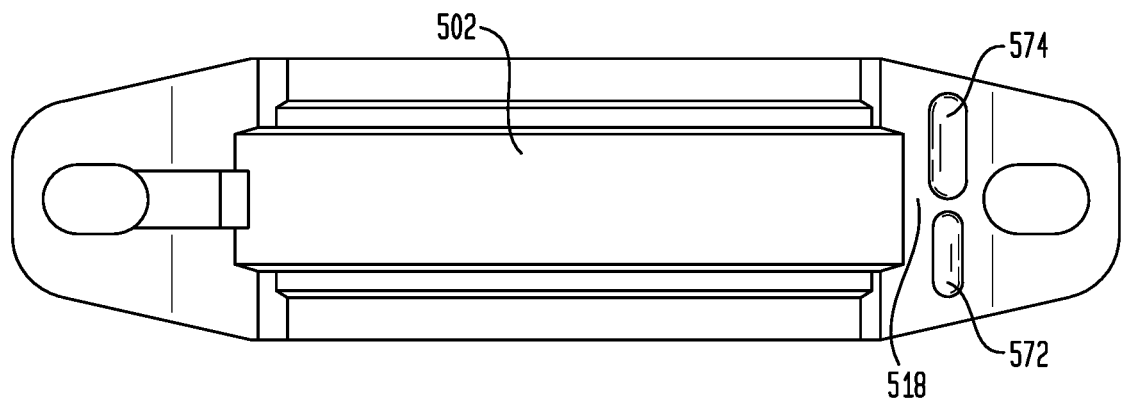
FIGS. 11A and 11B illustrate a bottom view of a first housing segment and a clos-up perspective view of a second housing segment according to yet another embodiment.
Figure 11B:
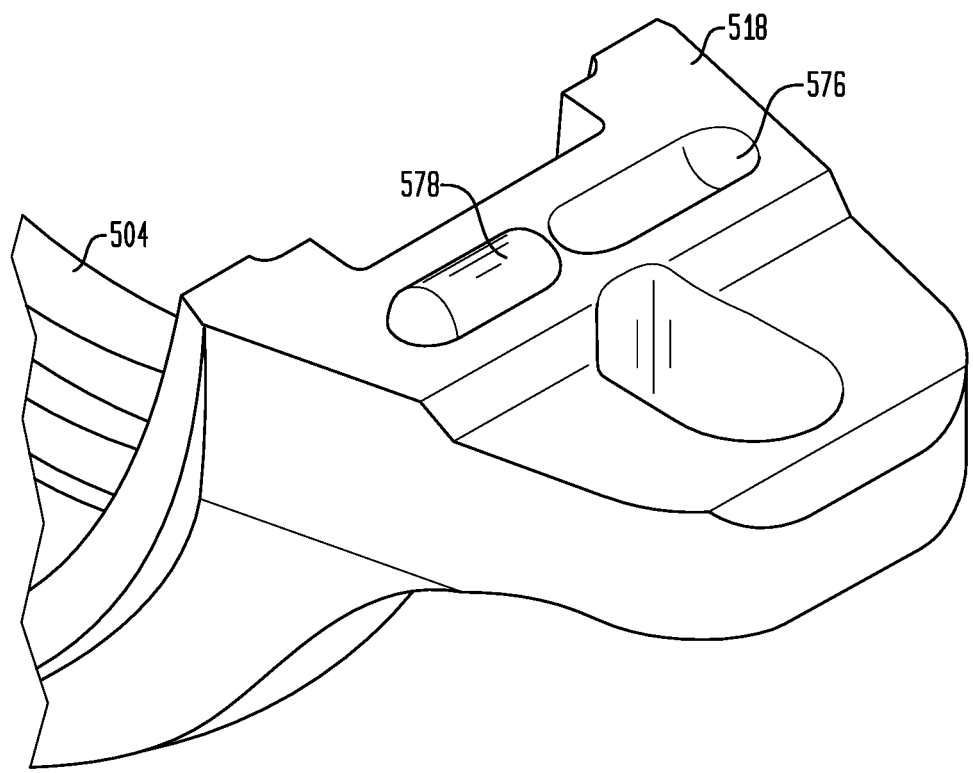
Figure 12:
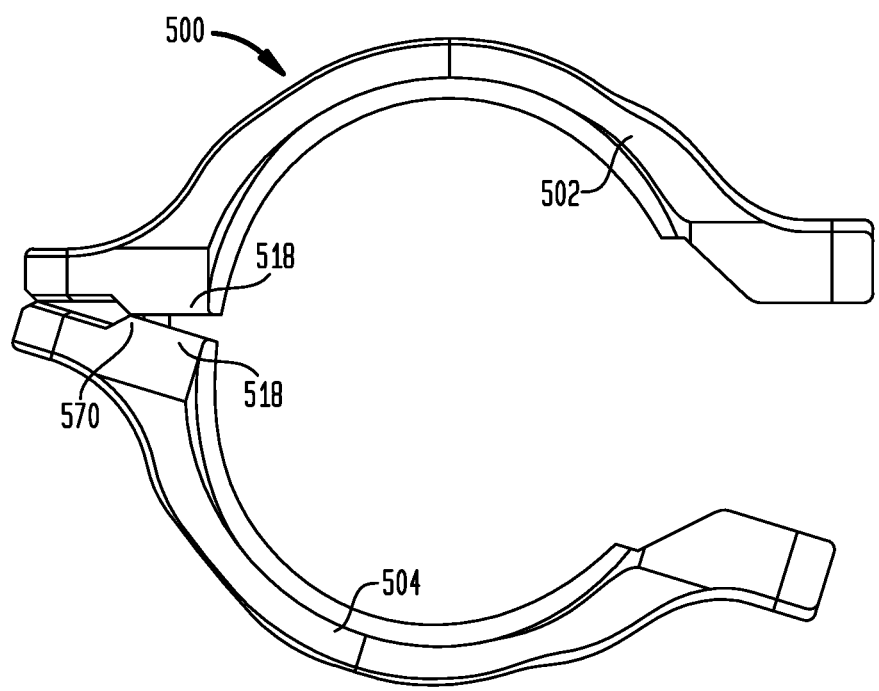
FIG. 12 illustrates a side view of a coupling according to the yet another embodiment, with components other than the first and second housing segments and the hing roller omitted.
Figure 13:
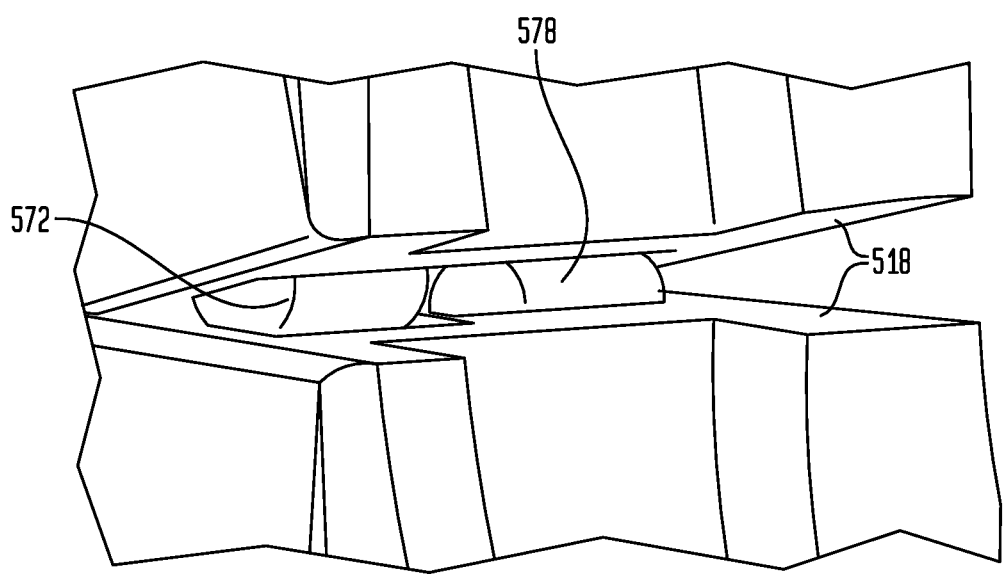
FIG. 13 illustrates a close-up view of the hinge roller according to the yet another embodiment.

FIGS. 11A and 11B illustrate a bottom view of a first housing segment 502 and a close-up perspective view of a second housing segment 504 according to the present embodiment. FIG. 12 illustrates a side view of the coupling 500 showing the first and second housing segments 504 and the hinge roller 570 with the other components omitted. FIG. 13 illustrates a close-up perspective view of the hinge roller 570. As shown in FIGS. 11A and 11B, the hinge roller 570 comprises a first male element 572 provided on the first housing segment 502 and a second female 576 element provided on the second housing segment 504. When the coupling is in preassemble state ready to install, the first male element 572 on the first housing segment 502 engages with the second female element 576 on the second housing segment 504 while allowing pivot movement of the two housing segments relative to each other, and restricting sliding movement relative to each other. More specifically, the first male element 572 and the second female element 576 are provided on the respective bolting pads 518, which face each other, of the respective first and second housing segments 502 and 504. Both the first male element 572 and second female element 576 can be formed as half cylinder to facilitate the hinge or pivot movement. However, in other embodiments, the male and female element can be of other shape as long as they engage with each other while allowing hinge movement between the first and second housing segments. For example, they can be hemisphere, or a general pair of key and slot with sufficient space allowing the pivotal hinge movement.

FIGS. 12 and 13 illustrates the coupling 500 when the first and second housing segments 502 and 504 engage with each other through the hinge roller 570 at the hinge side. The hinge roll 570 aids to keep the housing segments at appropriate position, and functions as a hinge for the first and second housing segments to pivot about during the installation and removal of the coupling.

The hinge roller also resists motion in some degree in the direction perpendicular to the pipe axis and in the direction along the pipe axis, therefore aid in maintaining the relative housing position during shipping and handling operations. This results in a much stiffer assembly which improves the customer's installation experience. The hinge roller geometry can be made up of a male half cylinder and matching female half cylinder which are positioned between the gasket pocket and hinge contact pad on the hinge side bolting portions. These features are positioned so that the same housing casting may be used for the top and bottom components. Evaluations of such couplings show significantly improved alignment between the housings, even when external forces are applied.

The hinge roller may comprise more than one pair of male and female elements. As shown in FIGS. 11A and 11B, the first housing segment 502 further comprises a first female element 574 in addition to the first male element 572, and the second housing segment 504 further comprises a second male element 578 in addition to the second female element 576. Similar to the pair of male element 572 and female element 576, when the coupling is in preassemble state ready to install, the first female element 574 on the first housing segment 502 engages with the second male element 578 on the second housing segment 504 while allowing pivot movement relative to each other. Similarly, the first female element 574 and the second male element 578 are provided on the respective bolting pads 518, which face each other, of the respective first and second housing segments 502 and 504. Both the first male element 572 and second female element 576 can be formed as half cylinder to facilitate the hinge or pivot movement. However, the other pair of the male element 574 and female element 578 may be provided at other positions and formed in other shapes. Additional pair of engaging elements offers similar advantages, and provides better resist to a twist movement of the housing segments in a direction perpendicular to the pipe axis. Even number of pairs of engaging elements also makes it possible to keep the two housing segments symmetric or identical to each other so as to reduce manufacturing cost.

The hinge roller is typically positioned between the gasket pocket and the bolting portion. This position is required to maintain minimum wall thickness requirements of the ductile iron sand castings process in the regions between the gasket pocket and hinge rollers and between the bolting portion and hinge roller. This placement locates the hinge roller adjacent to the actual hinge point of the coupling assembly. The height of the rollers is sufficient to maintain engagement as the coupling hinges to the full open position as shown in FIG. 12.

Figure 14:
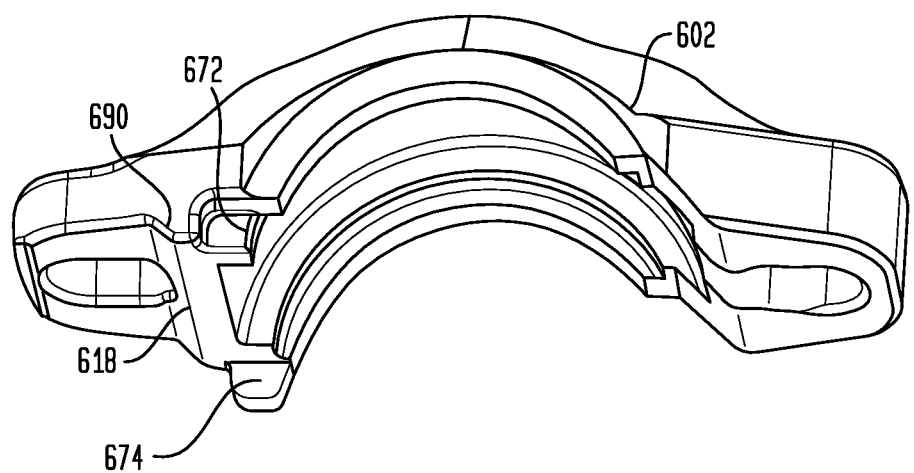
FIG. 14 illustrates a perspective view of a first housing segment with a hinge roller according to an alternative embodiment.
Figure 15B:
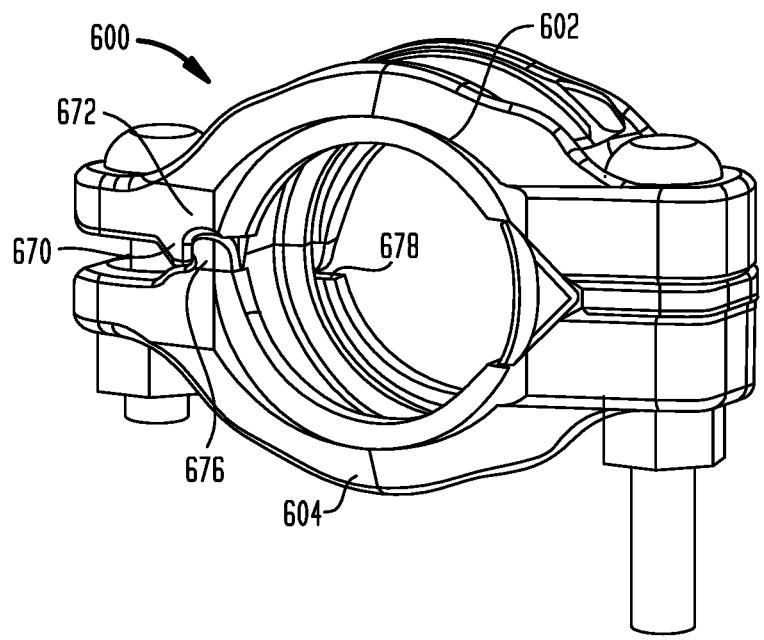

FIGS. 14 and 15 illustrate a hinge roller according to an alternative embodiment that may be applied to the previously disclosed couplings. FIG. 14 illustrates a perspective view of a first housing segment 602. FIG. 15A illustrates a perspective view of the coupling 600 in the preassembled state, and FIG. 15B illustrates a perspective view of the coupling 600 in the assembled state. As shown in FIGS. 14 and 15, the hinge roller 670 comprises a first female element 672 provided on the first housing segment 602 and a second male 676 element provided on the second housing segment 504. The hinge roller 670, that is, the pair of female and male elements 672 and 676 engage with each other while allowing pivot movement of the two housing segments relative to each other.

In the alternative embodiment, the hinge roller 670 is provided at a side 690 of the bolting pads 618 instead of the faces of the bolting pads that face and contact with each other. The female element 672 and male element 676 are formed as square with rounded corners. However, they can be formed in other shapes, such as half cylinder, sphere or hemisphere, etc. The hinge roller 670 may also comprise an addition pair of a first male element 674 on the first housing segment 602 and a second female element 678 on the second housing segment 604, that may engage with each other while allowing the hinge or pivot movement of the housing segments.

The hinge roller in this alternative embodiment offers similar advantages as the previously disclosed embodiment. Due to manufacturing constraints of the ductile iron casting process, the hinge roller as shown in FIGS. 14 and 15 are more feasible for smaller coupling sizes (for example, no more than 2.5 inches).

In general, the hinge roller disclosed herein may prevent excessive motion of the two segments relative to one another. In the case of the quick install coupling, the top and bottom housing segments may not be fully constrained by the "hinge bolt" or the first bolt at the hinge side. Thus, the hinge roller helps to prevent or reduce two housing segments shifting relative to one another, thereby prevent or reduce misalignment between the hinge contact points, and also between the housing segments. The shifting of hinge contact points could lead to increased stress in the coupling as the housings are hinged into contact during installation. This condition would otherwise over-stress the bolt ears (bolting portions).

The installation ready coupling disclosed previously may be practiced with a traditional gasket design, or with an improved gasket disclosed herein.

A sealing element or gasket typically resides between the coupling housing and the pipe to prevent fluid from escaping the piping system. Installation ready couplings with gaskets, sometimes referred to as stab couplings, do not require disassembly for installation, whereas standard couplings require that the gasket be removed and independently installed onto the piping segment prior to installing the housings. Installation ready couplings typically have a gasket that is initially oversized so that it can slide over the piping segment without disassembly. The housings then provide compression onto the gasket to creating a seal between the piping segment and gasket.

Figure 16:
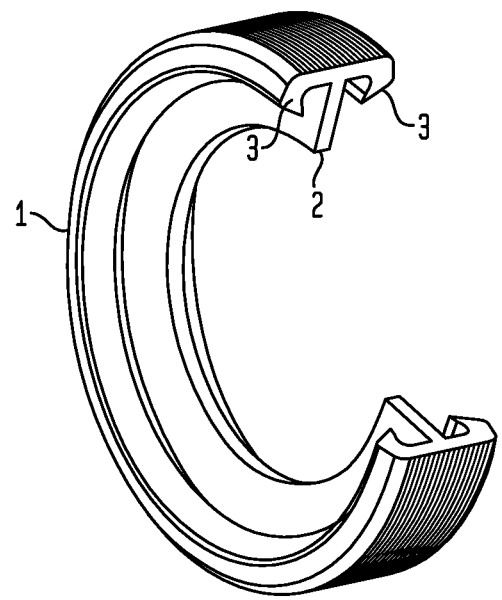
FIG. 16 illustrates a cut-out perspective view of a traditional gasket.

Since installation ready gaskets are typically oversized, so that they can be easily inserted over the pipe segment. This creates the needs for the gaskets to be highly compressed or distorted, when the housings are applied in order to displace the material against the pipe segment to get a sufficient seal. This high level of compression or distortion creates an issue in that the gasket material does not expand uniformly. This is especially evident in the traditional gasket as shown in FIG. 16, which illustrates a perspective cut-out view of a traditional gasket 1. The traditional gasket 1 comprises a center leg 2 protruding from the body portion beyond the primary seals 3 inwards of the gasket 1. The center leg 2 also extend substantially the complete inner circumstantial surface of the gasket 1, which also provides a stop between the pipe segments (not shown) during assembly. When the material expands non-uniformly it can cause sealing issues, especially when the system is operating at a low pressure (40 psig or less).

Figure 17:
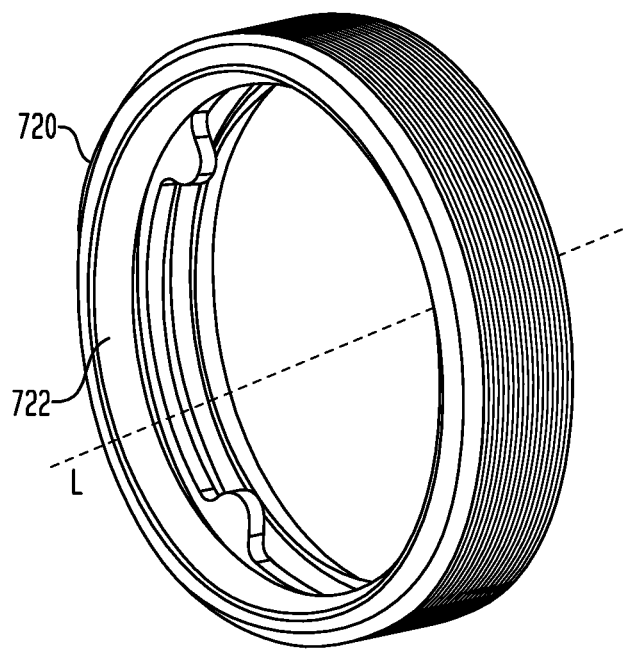
FIG. 17 illustrates a perspective view of a gasket according one embodiment.
Figure 19:
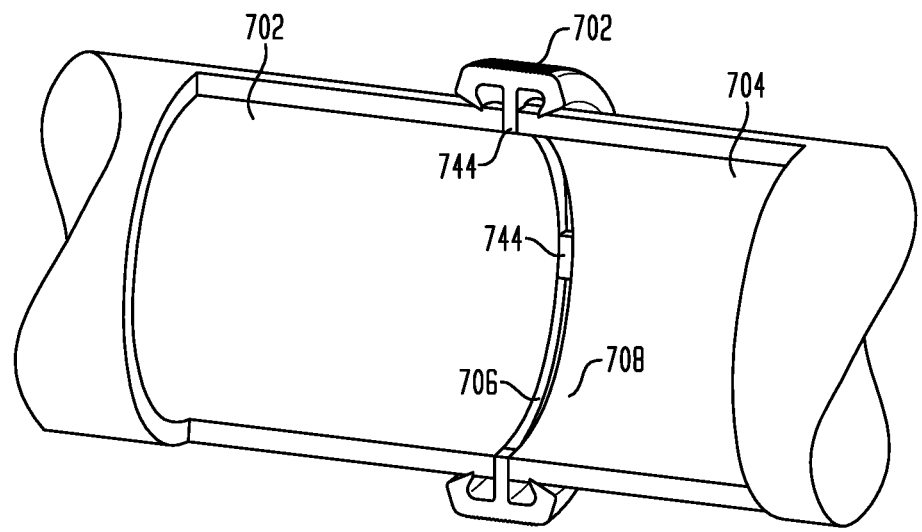
FIG. 19 illustrates a cut-out view of the gasket when it is installed to seal two pipe ends before the coupling is tightened.
Figure 20:
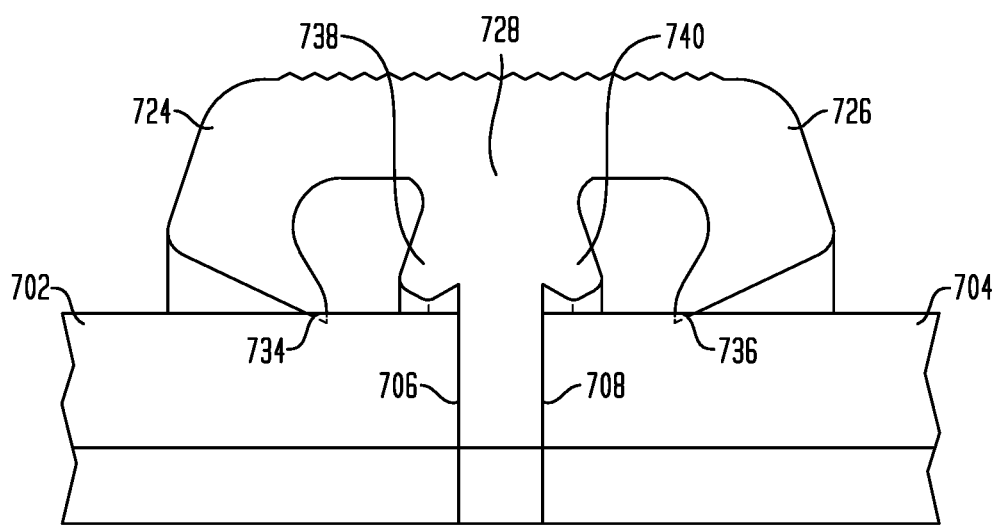
FIG. 20 illustrates a close-up cross section view of the gasket as shown in FIG. 19.

FIGS. 17-20 illustrate a gasket 720 according to one embodiment of the novel gasket design. FIG. 17 illustrates a perspective view of the gasket 720. FIGS. 18A and 18B illustrate partial cut-out views of the gasket 720 at respective positions provided without and with a stop tab. FIG. 19 illustrates a cut-out view of the gasket 720 when it is installed to seal two pipe ends before the coupling is tightened. FIG. 20 is a close-up cross section view of the gasket 720 as shown in FIG. 19.

As shown in FIGS. 17-20, the gasket 720 comprises a circular body portion 722, primary seals 724 and 726 located on opposite ends of the body portion in the direction of center axis L, respectively, and a center leg 728 protruding inward from the interior surface of the body portion 702. In one embodiment, the center leg 728 is located in the center of the body portion along the direction of center axis L.

Each of the primary seals 724 and 726 comprising a sealing lip 730 or 732 extending toward the center axis L of the body for a first distance d1, and then turning inward toward the center of the body portion while extending towards the center axis and gradually narrowing into a tip 734 or 736. Two bridges 738 and 740 are located on each side of the center leg 728 and protruding outward relative to the center leg 728. A relief pocket 742 is provided on the exterior of the body portion 722, wherein the body portion 722 gradually narrows from each of the axial ends toward the center of the body portion, so that a cross-section along a radial direction of the body portion has a concave exterior surface, as show in FIGS. 18A and 18B. A plurality of tabs 744 are evenly distributed along the center leg 728 and extend toward the center axis L. However, in another embodiment, the tabs may be unevenly distributed along the center leg or the interior surface of the main body. Furthermore, only one tab can be provided. In this embodiment, the tabs 744 are semicircular in shape. The center leg 728 does not extend beyond the seal lip in the radial direction R towards the center axis. However, the tabs 744 protrude from the center leg and extend beyond the seal lips in the radial direction R toward the center axis L.

FIG. 19 illustrates a cut-out view of the gasket 720 when the pipe ends 706 and 708 of the pipe segments 702 and 704 are inserted into the coupling (not shown), prior to tightening of the coupling. FIG. 20 illustrates a close-up view of a part of FIG. 19. The cross section is taken at a position where a tab is provided. As shown in FIGS. 19 and 20, the tips 734 and 736 of the primary seals 724 and 726 make contact with the exterior surfaces of the pipe segments, while the bridges 738 and 740 do not make contact to exterior surfaces of the pipe segments 702 and 704. The pipe ends 706 and 708 also press against the tabs which function as a stop. In this case, when the coupling is tightened, the primary seals 724 and 726 and the bridges 738 and 740 compress against the pipe segments, the center leg 728 and the tabs become located between the two pipe segments 702 and 704, and the tabs do not substantially extend into an interior space of the pipe segments.

The improved gasket disclosed herein addresses the common issues associated with grooved couplings that are described above. The novel gasket minimizes the non-uniform distortion associated with compressing the gasket. It achieves this advantage by incorporating several unique features shown below.

The height of center leg 728 of the gasket is reduced to a minimum. Much like an I-beam, when the center leg 728 is reduced in height, it gives the center leg the ability to bend without buckling. By reducing this height, the gasket center leg can conform to the shape of the pipe with minimal distortion. This minimizes the stress not just at the center leg, but also the stress that creeps into the outer sealing legs.

When the height of the center leg 728 is reduced as stated, there may be no adequate material to keep the coupling from sliding past the end of the pipe segment during installation, since the center leg normally functions as a stop to prevent this from happening. Thus, a series of tabs 744 are incorporated that are just tall enough to prevent the coupling from sliding past the end of the pipe, but the tabs 744 are also sized to not to interfere with the flow path on the inner diameter of the piping system. The tabs are sized and configured so that they have adequate strength to support the weight of the coupling when installed onto a vertical pipe arrangement, but also sized small enough so that they do not restrict the gasket center leg movement during installation. These tabs 744 do not extend past pipe inner diameter (ID), thus do not interfere with flow path within the pipe.

Additionally, bridges 738 and 740 are added to allow the gasket to handle vacuum conditions more easily. On both sides of the center leg 728, a bridge 738 or 740 is provided that spans the gap between the two pipe segments. The bridges do not touch the pipe during initial installation as shown in FIG. 20, but move to contact the outer diameter of the pipe as the housing segments of the coupling are brought together. This creates a seal between the bridges and the pipe during vacuum conditions only when the bridges are pulled into tighter contact with the pipe outer diameter. During positive pressure conditions the pressure can blow past this bridge and energize the high pressure to the lips of the gasket as it normally would.

With the addition of the bridges 738 and 740 as aforementioned, a relief pocket (concave) 742 is added to minimize distortion to the bridge during assembly. As the housing segments (not shown) are tightened around the gasket 720 and the bridges 738 and 740 are brought into contact with the pipe segments, it is desired not to over-compress the bridges. The bridges 738 and 740 are designed to only seal during a vacuum condition, so it is not desired to compress the bridge such that it creates a seal during positive internal pressure in the piping system. In order to avoid over-compression of the bridges during installation, and allow the bridges to move away from the pipe during a positive pressure situation, the relief pocket 742 is provided to the outer diameter of the gasket. This relief pocket creates a void between the gasket outer diameter and the housing inner surface, and thus allow a space for the gasket material to flow to during installation and under high pressure conditions.

The improved gasket also features two primary seals at each end of the body. The seals are sized such that an initial interference fit is present when the pipe is inserted into the coupling assembly as shown in FIG. 20. This interference is slight, as to not cause too much extra force for the user but enough that the gasket centers on the pipe due to the conical shape of the seal and the interference fit.

Figure 21:
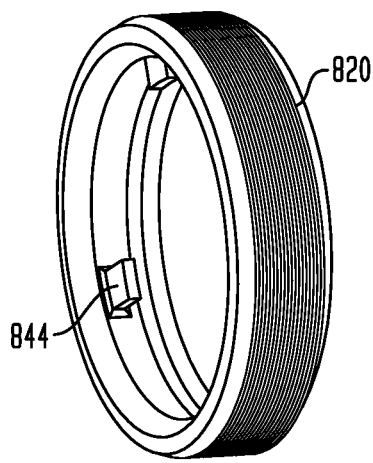
FIG. 21 illustrates a perspective view of a gasket according to an alternative embodiment.

FIG. 21 shows a gasket 820 according to an alternative embodiment. The tabs 844 may comprise an alternative shape such as a rectangular shape, instead of a semicircular shape with rounded top and tapered bottom edge which transition smoothly to the center leg as shown in FIG. 18A.

Figure 22:
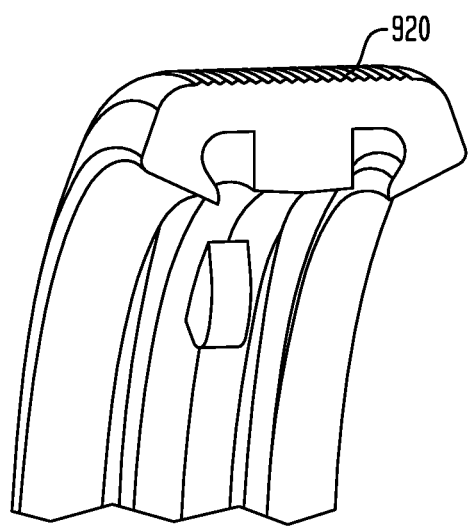
FIG. 22 illustrates a gasket according to another alternative.

FIG. 22 illustrates a gasket 920 according to another alternative embodiment that has eliminated the bridges extending outward from the center leg. The height of the center leg varying from this extreme case to height shown in other figures are all considered within this disclosure. Typically, center leg does not reach outer surface of the pipe segments.

Figure 23A:
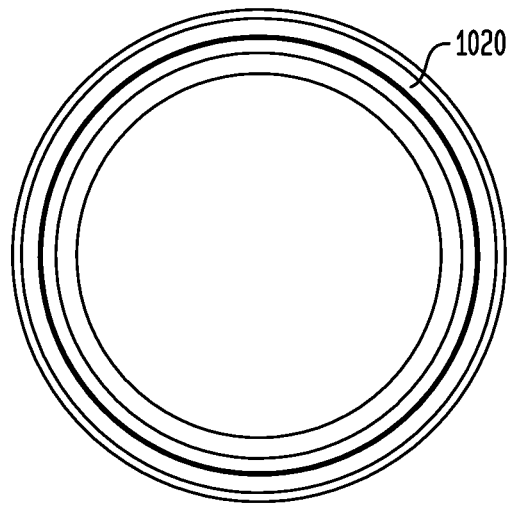
FIGS. 23A-23C illustrate a side view, a cut-out view, and a partial cross section view of a gasket according to further another alternative embodiment.
Figure 23B:
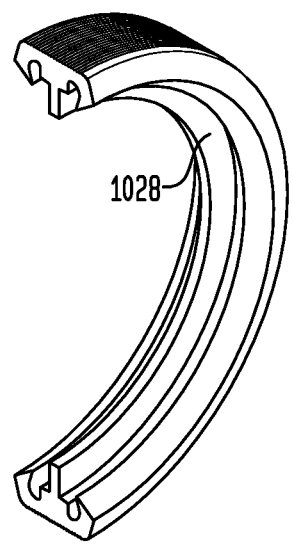
Figure 23C:
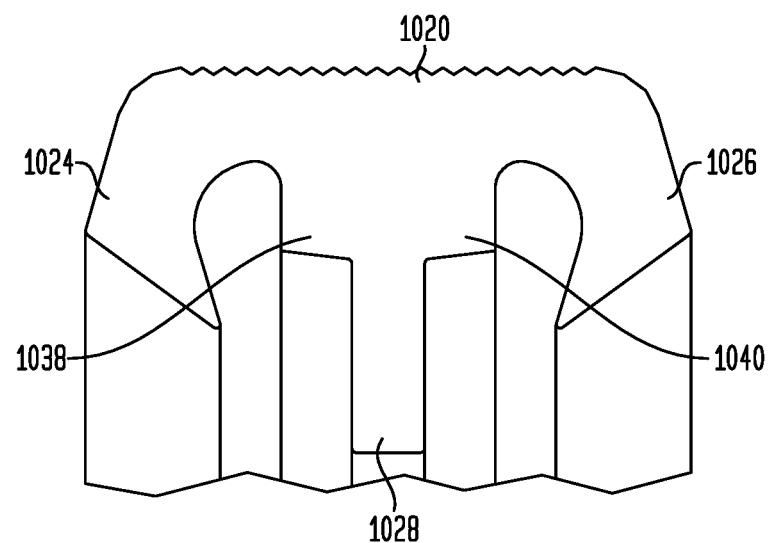

FIGS. 23A-23C illustrate a side view, a cut-out view, and a partial cross section view of a gasket 1020 according to further another alternative embodiment. The gasket 1020 comprises a continuous insertion stop leg 1028 located at the center of the gasket body and extending towards the center axis. The center leg 1028 may extends beyond the lip seals 1024 and 1026 towards the center axis. In the circumferential direction, the center leg 1028 extend substantially the whole circle of the gasket 1020. The bridges 1038 and 1040 provided at the opposite sides of the center leg 1028 extend toward the center axis of the gasket and form respective steps between the bridges and the center leg 1028. The insertion stop leg prevents over-insertion of the pipe during installation and provides tactile feedback to the user that the maximum insertion depth has been reached. The shape of the insertion stop leg is not significant, except that the geometry must withstand the weight of the coupling assembly in vertical installation applications and also withstand installation forces as the coupling assembly is put into place over the pipe segments. The insertion stop leg may be sized such that no portion of the insertion stop leg is located within the piping flow path or sized such that a small segment may protrude into the flow path to compensate for potential tolerances in the pipe.

Figure 24:
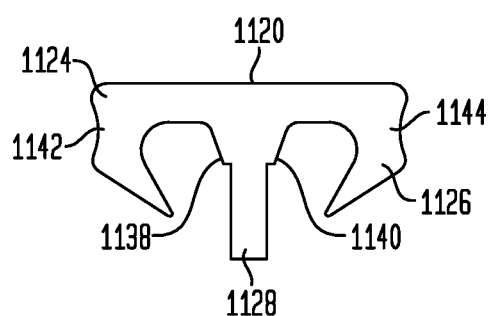
FIG. 24 illustrates a cross section view of a gasket according to yet another alternative embodiment.

FIG. 24 illustrates a cross section view of a gasket 1120 according to yet another alternative embodiment. The gasket 1120 is similar to the gasket 1020 in that it also comprises an insertion stop leg 1128 that extend inward (toward the center axis of the gasket) beyond the lip seals 1124 and 1126. The bridges 1138 and 1140 form a step with the center leg 1128. The bridges 1138 and 1140 are tapered towards their respective ends and thus each forms a slopped side surface. Furthermore, the lip seal may each further comprise a concave 1142 or 1144 on its outer side.

The gaskets show and described herein can be applied to the couplings 100, 200, 300, 500, and 600 according to the present invention and may also apply to any other couplings configured to connect two pipe segments.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed:

1. A coupling configured for connecting two grooved pipe ends, comprising a first and second housing segments, each comprising
- an arcuate center portion, wherein an interior surface of the center portion comprising two arcuate keys for engaging the grooves of the two pipe ends;
- a first bolting portion, comprising a first bolt hole and a first coupling bolt pad; and
- a second bolting portion, comprising a second bolt hole and a second coupling bolting pad,
- wherein the interior surfaces of the first and second housing segments are facing each other, creating a center cavity;

a gasket located within the center cavity;
a first bolt connecting the first and second housing segments through the first bolt holes of the first bolting portions of each of the first and second housing segments;
a first nut affixed to the first bolt;
a second bolt connecting the first and second housing segments through the second bolt holes of the second bolting portions of each of the first and second housing segments;
a second nut that is adjustable along the second bolt; and
a hold open clip comprising
- a mounting portion comprising an opening that accommodates the first bolt and extending in a longitudinal direction and a width direction, wherein the opening does not allow passage of the first nut or a bolt head of the first bolt;
- a tab connected to a side of the mounting portion and having an outer edge; and
- wherein the tab is bent relative to the mounting portion while the tab extends away from the mounting portion, whereby the outer edge is located outside of the mounting portion.

2. The coupling of claim 1, wherein the mounting portion is flat.

3. The coupling of claim 1, wherein the mounting portion is bent.

4. The coupling of claim 3, wherein the mounting portion is flattened when the coupling is tightened.

5. The coupling of claim 1, wherein the tab extends over a part of the side of the mounting portion.

6. The coupling of claim 1, wherein the tab comprises a first tab and a second tab that are connected to opposite sides of the mounting portion.

7. The coupling of claim 1, wherein each of the outer edges is slopped, and the hold open clip is mounted to the first bolt in an orientation that a thicker side of the hold open clip is located away from a center of the coupling.

8. The coupling of claim 1, wherein the hold open clip maintains the coupling in a spaced apart configuration when the coupling is not tightened.

9. The coupling of claim 1, wherein the tab pivots away from the mounting portion so that the hold open clip is flattened when the coupling is tightened.

10. The coupling of claim 1, wherein the hold open clip is formed from at least one selected from a group comprising sheet metal, stamped metal, cast metal, machined plastic, and molded plastic.

* * * * *